United States Patent
Anderson et al.

(10) Patent No.: US 10,949,822 B2
(45) Date of Patent: Mar. 16, 2021

(54) METHODS AND SYSTEMS FOR PROVIDING PAYMENT INTERFACE SERVICES USING A PAYMENT PLATFORM

(71) Applicant: STRIPE INC., San Francisco, CA (US)

(72) Inventors: Christian Anderson, San Francisco, CA (US); Stanislas Polu, San Francisco, CA (US)

(73) Assignee: STRIPE INC., San Francisco, CA (US)

( * ) Notice: Subject to any disclaimer, the term of this patent is extended or adjusted under 35 U.S.C. 154(b) by 0 days.

(21) Appl. No.: 15/081,696

(22) Filed: Mar. 25, 2016

(65) Prior Publication Data

US 2017/0278085 A1     Sep. 28, 2017

(51) Int. Cl.
*G06Q 20/12*     (2012.01)
*G06Q 20/22*     (2012.01)
(Continued)

(52) U.S. Cl.
CPC ........... *G06Q 20/12* (2013.01); *G06Q 20/027* (2013.01); *G06Q 20/227* (2013.01); *G06Q 20/405* (2013.01)

(58) Field of Classification Search
CPC .. G06Q 20/36; G06Q 20/405; G06Q 20/3572; G06Q 20/027; G06Q 30/02; G06Q 10/04; G06Q 30/0255; G06Q 20/145; G06Q 30/0224; G06Q 20/20; G06Q 20/00; G06Q 20/08; G06Q 20/22; G06Q 30/0641;
(Continued)

(56) References Cited

U.S. PATENT DOCUMENTS 8,453,508 B2 * 6/2013 Delgado ................ G01N 29/44
                                                                   73/618
8,543,508 B2 * 9/2013 Katzin ................... G06Q 20/40
                                                                   705/44
(Continued)

OTHER PUBLICATIONS

Clyne, Matt, "How acquirers can help clients pick the right payment", ISO & Agent; New York vol. 3, issue 6, Sep. 1, 2014, pp. 1-5. (Year: 2014).*

(Continued)

*Primary Examiner* — Mohammad Z Shaikh
(74) *Attorney, Agent, or Firm* — Womble Bond Dickinson (US) LLP

(57) ABSTRACT

In embodiments, methods and systems for implementing payment interface services using a payment platform are provided. Multiple payments types are integrated into the payment platform to support customer payments for merchants. The payment platform identifies payment types that are relevant to a customer based on receiving an indication to personalize payment types for the customer, and on customer data resources that are accessed. One or more relevant payment types are determined based on the information of the customer. The payment types for the customer are determined from a plurality of payment types supported via the payment platform that supports customer payment type personalization. A payment type from the one or more payment types relevant to the customer is automatically chosen or explicitly chosen by the customer, such that a corresponding payment type provider authenticates the customer in order to complete the transaction.

23 Claims, 10 Drawing Sheets

(51) Int. Cl.
*G06Q 20/40* (2012.01)
*G06Q 20/02* (2012.01)

(58) Field of Classification Search
CPC ........... G06Q 30/0613; G06Q 30/0253; G06Q 20/12; G06Q 20/227; G06F 21/31
See application file for complete search history.

(56) References Cited

U.S. PATENT DOCUMENTS

| | | | | |
|---|---|---|---|---|
| 8,615,467 B2* | 12/2013 | Akella | ................... | G06Q 20/10 705/35 |
| 8,639,846 B2* | 1/2014 | Singh | ..................... | H04L 67/28 709/246 |
| 8,762,451 B2* | 6/2014 | Katzin | .................. | G06Q 30/06 709/203 |
| 8,788,324 B1* | 7/2014 | Shetty | ................. | G06Q 30/0601 705/14.1 |
| 9,092,776 B2* | 7/2015 | Dessert | .................. | G06Q 20/40 |
| 9,652,751 B2* | 5/2017 | Aaron | .................. | G06Q 20/04 |
| 9,836,739 B1* | 12/2017 | Borovsky | .......... | G06Q 20/3572 |
| 9,858,564 B2* | 1/2018 | Ready | .................... | G06Q 20/20 |
| 9,934,500 B2* | 4/2018 | Guyot | ................... | G06Q 20/20 |
| 10,134,078 B2* | 11/2018 | Bentrup | ............ | G06Q 30/0633 |
| 10,210,543 B2* | 2/2019 | Windmueller | ..... | G06Q 30/0261 |
| 10,268,996 B1* | 4/2019 | Wannamaker | ......... | G06Q 30/00 |
| 2004/0024703 A1* | 2/2004 | Roskind | ................ | G06Q 20/02 705/40 |
| 2005/0049974 A1* | 3/2005 | Jani | ........................ | G06Q 20/12 705/64 |
| 2008/0103923 A1* | 5/2008 | Rieck | ................. | G06Q 30/0635 705/26.41 |
| 2009/0024546 A1* | 1/2009 | Ficcaglia | .......... | G06F 17/30867 706/12 |
| 2010/0312650 A1* | 12/2010 | Pinckney | ............... | G06N 20/00 705/14.66 |
| 2011/0313900 A1* | 12/2011 | Falkenborg | .......... | G06Q 20/227 705/30 |
| 2011/0320345 A1* | 12/2011 | Taveau | ................... | G06Q 20/32 705/39 |
| 2012/0011067 A1* | 1/2012 | Katzin | .................. | G06Q 20/027 705/44 |
| 2012/0030066 A1* | 2/2012 | Stringfellow | .......... | G06Q 20/02 705/26.41 |
| 2012/0123841 A1* | 5/2012 | Taveau | ................... | G06Q 20/10 705/14.23 |
| 2013/0036046 A1* | 2/2013 | Rom | ...................... | G06Q 20/12 705/40 |
| 2013/0054454 A1* | 2/2013 | Purves | .................. | H04L 67/306 705/41 |
| 2013/0159080 A1* | 6/2013 | Wu | ........................ | G06Q 30/02 705/14.23 |
| 2013/0226784 A1* | 8/2013 | He | ........................ | G06Q 40/02 705/38 |
| 2013/0256403 A1* | 10/2013 | MacKinnon | ............. | G06K 5/00 235/375 |
| 2013/0268437 A1* | 10/2013 | Desai | ................... | G06Q 20/08 705/41 |
| 2013/0290172 A1* | 10/2013 | Mashinsky | ............ | G06Q 20/12 705/39 |
| 2014/0006149 A1* | 1/2014 | Grigg | ................... | G06Q 20/387 705/14.51 |
| 2014/0006276 A1* | 1/2014 | Grigg | .................... | G06Q 20/322 705/41 |
| 2014/0006277 A1* | 1/2014 | Rao | ...................... | G06Q 20/341 705/41 |
| 2014/0020068 A1* | 1/2014 | Desai | .................. | G06Q 20/382 726/4 |
| 2014/0052617 A1* | 2/2014 | Chawla | .................. | G06Q 20/12 705/39 |
| 2014/0058938 A1* | 2/2014 | McClung, III | ....... | G06Q 20/227 705/41 |
| 2014/0136353 A1* | 5/2014 | Goldman | ............. | G06Q 20/405 705/21 |
| 2014/0207669 A1* | 7/2014 | Rosenberg | ............. | G06Q 20/32 705/41 |
| 2014/0214651 A1* | 7/2014 | Prasadh | ............... | G06Q 20/027 705/39 |
| 2014/0222597 A1* | 8/2014 | Nadella | ................ | G06Q 20/204 705/21 |
| 2014/0249999 A1* | 9/2014 | Johnson | ............... | G06Q 20/027 705/39 |
| 2014/0279474 A1* | 9/2014 | Evans | ................ | G06Q 20/3572 705/41 |
| 2014/0279509 A1 | 9/2014 | Khilnani et al. | | |
| 2014/0372300 A1* | 12/2014 | Blythe | ............... | G06Q 20/3676 705/41 |
| 2014/0379576 A1* | 12/2014 | Marx | ............... | G06Q 20/35785 705/44 |
| 2015/0012425 A1* | 1/2015 | Mathew | .................. | G06Q 20/36 705/41 |
| 2015/0178708 A1* | 6/2015 | Reutov | ................ | G06Q 20/405 705/44 |
| 2015/0339782 A1* | 11/2015 | Fondekar | ............... | G06Q 40/12 705/30 |
| 2016/0019522 A1* | 1/2016 | Granbery | ............. | G06Q 20/227 705/21 |
| 2016/0063547 A1* | 3/2016 | Ghosh | ........... | G06Q 30/0255 705/14.53 |
| 2016/0071072 A1* | 3/2016 | Bailo | ................. | G06Q 20/4016 705/40 |
| 2016/0078428 A1* | 3/2016 | Moser | .................. | G06Q 20/105 705/41 |
| 2016/0078444 A1* | 3/2016 | Tomasofsky | ........... | G06Q 20/40 705/44 |
| 2016/0092870 A1* | 3/2016 | Salama | ................ | G06Q 20/367 705/71 |
| 2016/0132908 A1* | 5/2016 | von Walstrom | ... | G06Q 30/0202 705/7.25 |
| 2016/0162882 A1* | 6/2016 | McClung, III | ....... | G06Q 20/227 705/41 |
| 2016/0189312 A1* | 6/2016 | Lee | .................... | G06F 17/30991 705/30 |
| 2016/0192123 A1* | 6/2016 | Lim | ...................... | H04W 4/008 455/41.1 |
| 2016/0203506 A1* | 7/2016 | Butler, IV | .......... | G06Q 30/0222 705/14.23 |
| 2016/0232546 A1* | 8/2016 | Ranft | ................... | G06Q 40/025 |
| 2016/0328698 A1* | 11/2016 | Kumaraguruparan | ...................... | G06Q 20/3224 |
| 2017/0046759 A1* | 2/2017 | Chandrasekaran | ......................... | G06Q 30/0635 |
| 2017/0132627 A1* | 5/2017 | Phillips | ................ | G06Q 20/401 |

OTHER PUBLICATIONS

Andreoli, Jean-Marc; Pacull, Francois; Pareschi, Remo, "Xpect: a Framework for Electronic Commerce", IEEE Internet Computing, Jul.-Aug. 1997, pp. 1-10. (Year: 1997).*
International Search Report & Written Opinion for Application No. PCT/US17/21823, dated Mar. 31, 2017, 14 pages.
International Preliminary Report on Patentability received for PCT Patent Application No. PCT/US2017/021823, dated Oct. 4, 2018.
European Extended Search Report for Application No. 17770824.5, dated Aug. 13, 2019, 10 pages.
European Office Action on the Patentability of Application No. 17770824.5-1213, dated Nov. 17, 2020, 11 pages.

* cited by examiner

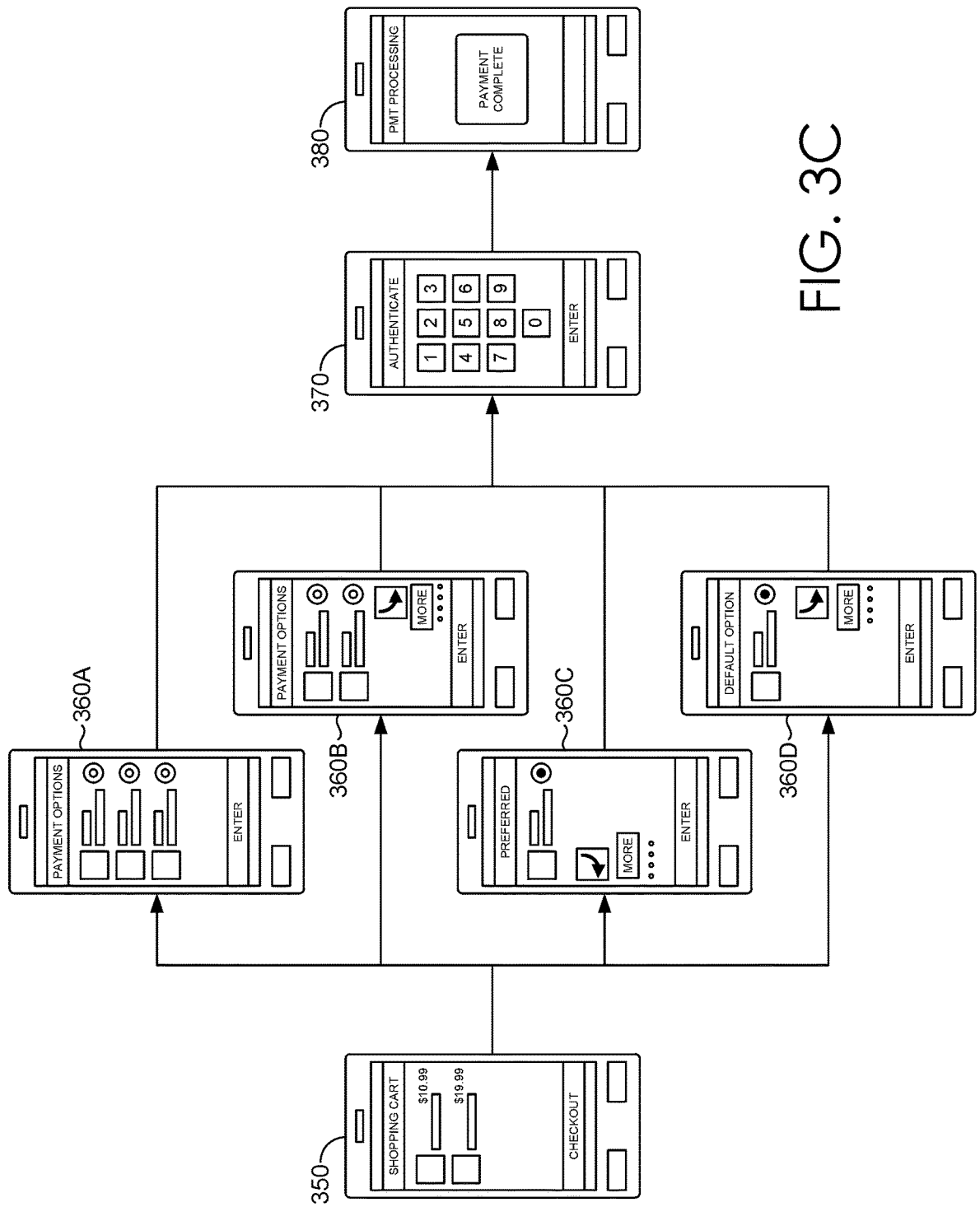

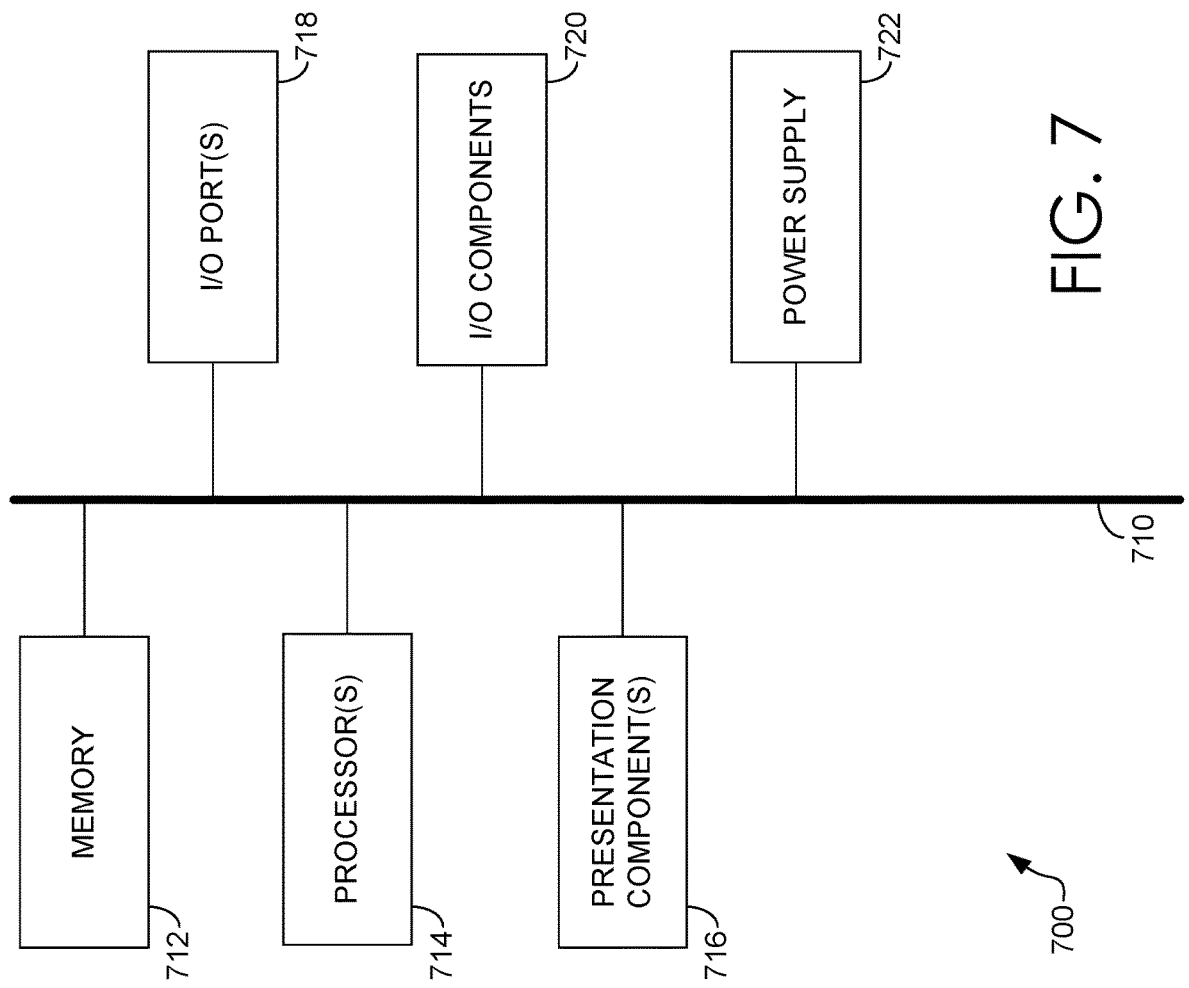

METHODS AND SYSTEMS FOR PROVIDING PAYMENT INTERFACE SERVICES USING A PAYMENT PLATFORM

BACKGROUND

Online merchants seek to optimize the conversion of their checkout pages. In particular, merchants want to increase the percentage of customers who, having arrived at the checkout page, complete a purchase. Several factors improve conversion rates, including that the checkout page is consistent with the rest of the merchant's website, and that there is a minimum amount of clutter, confusing interface, or unnecessary input on the checkout page. Deficiencies on a merchant's checkout page increase a likelihood that a customer will drop off without completing a purchase. As merchants increase their presence globally and as payment types proliferate, merchants are faced with supporting an increasing number of payment types in order to offer the most preferred payment types of each customer. In particular, merchants must integrate and manage each of these payment types for their merchant platforms. Integrating and managing these different payment types can present challenges for merchants because of the varied technical requirements of each of the payment type systems when interfacing with the merchants' platforms. Merchants further do not systematically utilize the interface with payment systems in any way, leverage existing customer relationships with payment type providers, or access customer data resources to determine payment types relevant to the customer. Conventional methods for providing support for multiple payment types (e.g., checkout pages with manually selectable options for payment types, electronic wallets that operate as funnels for payment types, and save-and-auto-fill features on online platforms) fall short of significant improvement to conversion on checkout pages or an improved technical implementation of integrating payment type systems and merchant platforms. As such, a solution for addressing the above-described issues would improve the operation of merchant systems, payment type provider systems, and customer online experiences.

SUMMARY

Embodiments described herein provide methods and systems for providing a payment platform that implements payment interface services for online systems. The payment interface (payment portal or payment gateway) can generally refer to a platform, module, or system that leverages payment type provider systems, merchant systems, and information of the customer to provide payment interface services (e.g., multiple payment types (payment methods) from payment type providers, customer payment type personalization, payment authentication, and payment processing) via a merchant's online platform (e.g., website or mobile application). In particular, a payment interface provider integrates several different payment type provider systems into a payment interface to support each of the payment types. In certain aspects, the integration with the payment types allows the payment interface provider to dynamically personalize the specific payment types that are shown to a particular customer, as described herein. The payment interface provider can support embedding the payment interface service components into merchant systems and payment type provider systems to support the functionality described herein.

By way of example, a merchant subscribes to a payment interface provider for payment interface services for their online system and the merchant provides a graphical user interface (e.g., a checkout page built by the merchant, furnished by the payment interface provider, etc.) to operate with a payment platform of the payment interface provider. In operation, a customer accesses the merchant online system, prepares to buy from the merchant and then performs actions indicating an intention to checkout to cause a checkout page to be presented to the customer. Presentation of the checkout page, amongst other features and customer actions, can be used as a trigger for providing payment interface services. The payment interface services can also be implemented independently in a modular manner such that the payment interface can support different offerings of the payment interface services to different merchants. The merchant systems, payment type provider systems, and payment platform operate in combination to implement the payment interface services through various steps of a payment interface workflow, as described herein.

The payment interface workflow includes payment type integration with the payment interface through an integration process, customer payment type personalization through a personalization process, a payment authentication process, and payment processing via a payment process. The payment type integration includes integrating or adding a payment type of a payment type provider as one of a plurality of payment types available using the payment interface. The integration further includes initializing a communication channel to communicate messages for implementing other services (e.g., customization, security, payment processing) with the payment interface. In this regard, the payment interface service provider supports integrating the different types of payment type providers into the payment interface service such that the merchant or the customer is not required to configure the payment interface service with their specific payment type providers.

The customer payment type personalization may begin with a customer electing to complete a transaction (e.g., selecting to check out for a purchase transaction) on a merchant's website. The personalization process can include discovering, selecting, and choosing payment types that are relevant to a customer, where the personalization process is based on information of the customer and customer data resources, as discussed herein in more detail. A payment type is relevant in that the payment type is a useable, applicable, or preferred payment type for the customer. For example, a payment type can be useable when a customer has an established relationship with a payment type provider (e.g., a customer has an AMEX credit card; a customer has used a particular credit card on a participating merchant in the past). Further, a payment type can be applicable when it simply is capable of being used. For example, a payment type is integrated into the payment platform, and based on a geographic region of the customer, where the particular payment type is common for transactions like the one contemplated, the payment type is determined to be applicable to the customer (e.g., a customer lives in China where a payment type provider—ALIBABA Group—offers ALI-PAY). The customer may not have an existing relationship with an applicable payment type provider. A preferred payment type may refer to a payment type that a customer has selected to use over other payment types. A preferred payment type can be for a payment type that the customer may or may not have an existing relationship with. A preferred payment type may be selected for one or more identified conditions. For example, a customer may select a preference for a specific payment type for a specific merchant (e.g., uses her BARCLAYCARD VISA at Walmart), may select a preference for a specific payment type for all grocery store purchases (e.g., instead of her BARCLAYCARD VISA she uses her CAPITAL ONE VISA), or may select a preference for a regional payment type (e.g., ALIPAY) for purchases from a particular region. Other variations and combinations of relevant payment types to a customer are contemplated with embodiments of the present disclosure.

Personalization includes discovery (i.e., an inquiry to customer data resources to identify a plurality of payment types relevant to the customer, the plurality of payment types relevant to the customer can be a subset of payment types of the payment interface). The personalization process also includes selection (i.e., identifying one or more payment types from the relevant payment types). All the relevant payment types can be selected or only subset of relevant payment types may also be selected to narrow the relevant payment types to the most relevant (i.e., useable, applicable, or preferred) payment types (e.g., the selection method may not select a payment type that has had no recent activity history for a predefined period of time; the selection method may not select a payment type that has no available credit). The personalization process may further include choosing a payment type as a chosen payment type (i.e., the payment types that are relevant to the customer are presented for a customer to choose a payment type for payment processing, or an automatic choice of a default payment type can be made without an explicit choice action by the customer).

In this regard, during the personalization process, by way of example, the payment interface queries customer data resources (e.g., internal and external customer data) to discover payment types associated with or selectable for the customer. The personalization process may include selecting only a subset of payment types that are discovered. The output of the payment type lookup (and optionally a selection of a subset of the payment lookup) can result in a single default payment type or a single default plus a short list of smart fallback payment types. The single default payment type can be automatically chosen for the customer or the short list of relevant payment types can be presented to the customer via the checkout page for the customer to then choose a payment type.

It is contemplated that the payment platform integrates over hundreds of different payment type providers, and as such the personalization process to identify payment types relevant to a customer can be based on algorithms that facilitate efficiently identifying the payment types. Discovery, selection and choice algorithms are steps taken for identifying payment types relevant to a customer. Algorithms may refer to calculations, data processing, and automated reasoning defined for the discovery, selection, and choice processes. An algorithm can determine whether a relationship exists between a customer and a payment type provider. For example, a discovery-query is generated based on information of the customer, the discovery-query is communicated to the payment type provider in a plurality of payment type providers, the payment type provider can communicate customer data needed for the query, the discovery-query includes comparing the customer data to information of the customer to determine if a match exists, and when a match exists, a determination is made that the customer has an existing relationship with the payment provider. In one example, the information of the customer can be a customer email address. In embodiments, the customer's email is hashed for security purposes and used as a look-up key to query each payment type provider for a match on the email. Algorithms can also rely on different types of data and computations to make determinations for discovery, selection and choice. For example, an algorithm can rely on customer payment type preference data, payment type provider customer data, and customer payment type historical data. Algorithms can include heuristics and threshold based computations to make determinations described herein. Other variations and combinations of personalization process algorithms are contemplated with embodiments described herein.

In another example, the payment platform may maintain a payment type provider fee database, where each payment type provider has an entry for a fee the payment provider charges for a transaction where payment processing is performed using the payment provider. For example, a first payment type may incur a 2% fee for transactions and a second payment type may incur a 3% fee per transaction. The payment type fee may be dynamically communicated by the payment type provider as part of the discovery process. Additionally, the payment platform can have access to historical conversion data. Historical conversion data can disclose what payment type customers used for payment and the corresponding merchants and transactions, including transaction details. The historical conversion data can be across a large amount of customers and potentially also include the customer currently checking out. With the historical conversion data, the payment platform can compute an expected conversion rate for the first payment type provider compared to the second payment type provider. The payment platform can also compute an expected fee for the first payment type provider compared to the second payment type provider. Comparing the expected conversion rate and expected fee allows the payment platform to determine which payment type provider maximizes the revenue for the merchant. In some scenarios it may be possible to maximize the conversion rate while minimizing the associated fee, while in other scenarios high conversion rates may also lead to high fees. The payment platform may be configured to prioritize the display of payment types based on one or more of the above described factors, for example, to maximize conversion, minimize fees, or some combination thereof.

The payment interface workflow can also include securing payment based on an authentication process. The authentication process may begin upon receiving a selection for a payment type. The authentication process may be part of the payment authentication service that provides improved security for payments processing. The authentication process can be implemented based on direct communication between the payment type provider and the customer, where the customer trusts their selected payment type provider. The payment type providers can support several different authentication processes. By way of example, the authentication process can be a mobile-based authentication process that uses a one-time code to provide strong, per-transaction authentication. The authentication process can be configured to have a primary authentication workflow (or option) and a secondary/fallback workflow (or option). For example, a common mobile-based authentication workflow and fallback is the following: to begin, the payment platform initiates authentication by sending information of the customer (e.g., transaction details) to the payment type provider. The payment type provider then pushes via a push notification the security information of the customer to a mobile application on the customer's mobile device. The customer can open the application in response to the push notification and then authenticate the information of the customer. The customer can authenticate the transaction using several different types of authentication mechanisms (e.g., a PIN, finger print or other authentication options via the mobile device, including passive authentication options). In a fallback workflow, for example a scenario where a customer does not have the payment type provider's mobile application installed on the customer's device, the authentication process uses a non-payment provider application (e.g., SMS-based authentication via a mobile device). In operation, the payment type provider sends an SMS to the customer's mobile device and then provides an authentication code that the customer then types in the checkout page to approve the transaction.

Payment processing includes communicating with the payment type provider to complete payment. Several payment processing schemes can be implemented to complete payment. It is contemplated that the moment at which funds are guaranteed depends on the payment type. In one example, the payment type provider debits the customer's account and then settles the funds to payment interface provider who settles to the merchant. In another example, the payment type provider and the payment interface provider may be the same entity, so the payment type provider debits the customer's account and then settles the funds to the merchant. Settling funds can refer to providing a credit to a party to whom the funds are due after crediting or debiting any fees that are due. Other variations and combinations of payment processing are contemplated with embodiments described herein.

With reference to FIG. 1, at a high level, an operating environment 100 for implementing embodiments described herein is illustrated. The operating environment 100 includes a host entity 110 (payment interface provider) that implements the payment interface to support payment interface services including multiple payment types 112 from payment type providers (e.g., payment type provider 120), customer payment type personalization 114, payment authentication 116, and payment processing 118 for merchants (e.g., merchant 130) using the payment platform. A payment interface provider manages the implementation and the relationship with the payment type providers so that merchants may not have to directly maintain them. A payment interface provider also leverages customer information available at the payment type provider to systematically personalize payment types for the customer and secure customer transactions. The payment platform is an integration of modular payment interface services based on Application Programming Interfaces of the payment platform that facilitate providing the payment interface services. The payment interface provider allows merchants to subscribe to the payment platform and have access to the different payment interface services available through the payment interface. The payment platform operates with payment type provider 120 and merchant 130 system components that standardize and customize the implementation of configurable payment interface services.

Based on a set of APIs and API specifications that create payment type provider service interfaces to facilitate integrating a plurality of payment type providers into the payment interface, the payment interface provider initializes communication channels with payment type providers for integrating payment types to accept payment. The communication channel can be used to provide different payment types from payment type providers. The communication channel can also be used to personalize payment types (i.e., identify a set of relevant payments types or identify a default payment type) for a customer at a merchant checkout page. The communication channel can also be used for payment authentication and payment processing services of the payment platform.

On the merchant side, the merchant (e.g., merchant 130) sells to customers (e.g., customer 140) via one or more online platforms. The customer can access the merchant online platform from different types of computing devices or platforms (e.g., desktop, laptop, wearable, and mobile devices). The merchant can implement an online platform checkout page based on APIs of the payment platform that create a merchant service interface with the payment platform. The merchant platform can have access to the payment interface services including multiple payment types from payment type providers, customer payment type personalization, payment authentication, and payment processing. At the merchant checkout page, the customer's transaction can be completed using payment interface services described herein. It is contemplated that the payment interface provider can add or improve upon payment interface services for the merchants and payment type providers. For example, the payment interface provider can acquire and integrate new payment type providers, payment types and other features into the payment platform and make them available via the payment interface. Accordingly, the payment platform supports many different payment type providers (and their corresponding payment types), customer payment type personalization, payment authentication, and payment processing, as described herein, to provide functionality that the merchant might otherwise not have access to or have resources to provide to their customers.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIGS. 3A-3C are schematics of an exemplary method and graphical user interfaces for implementing payment interface services using a payment platform, in accordance with embodiments described herein;

FIG. 7 is a block diagram of an exemplary computing environment suitable for use in implementing embodiments described herein.

DETAILED DESCRIPTION

Figure 1:
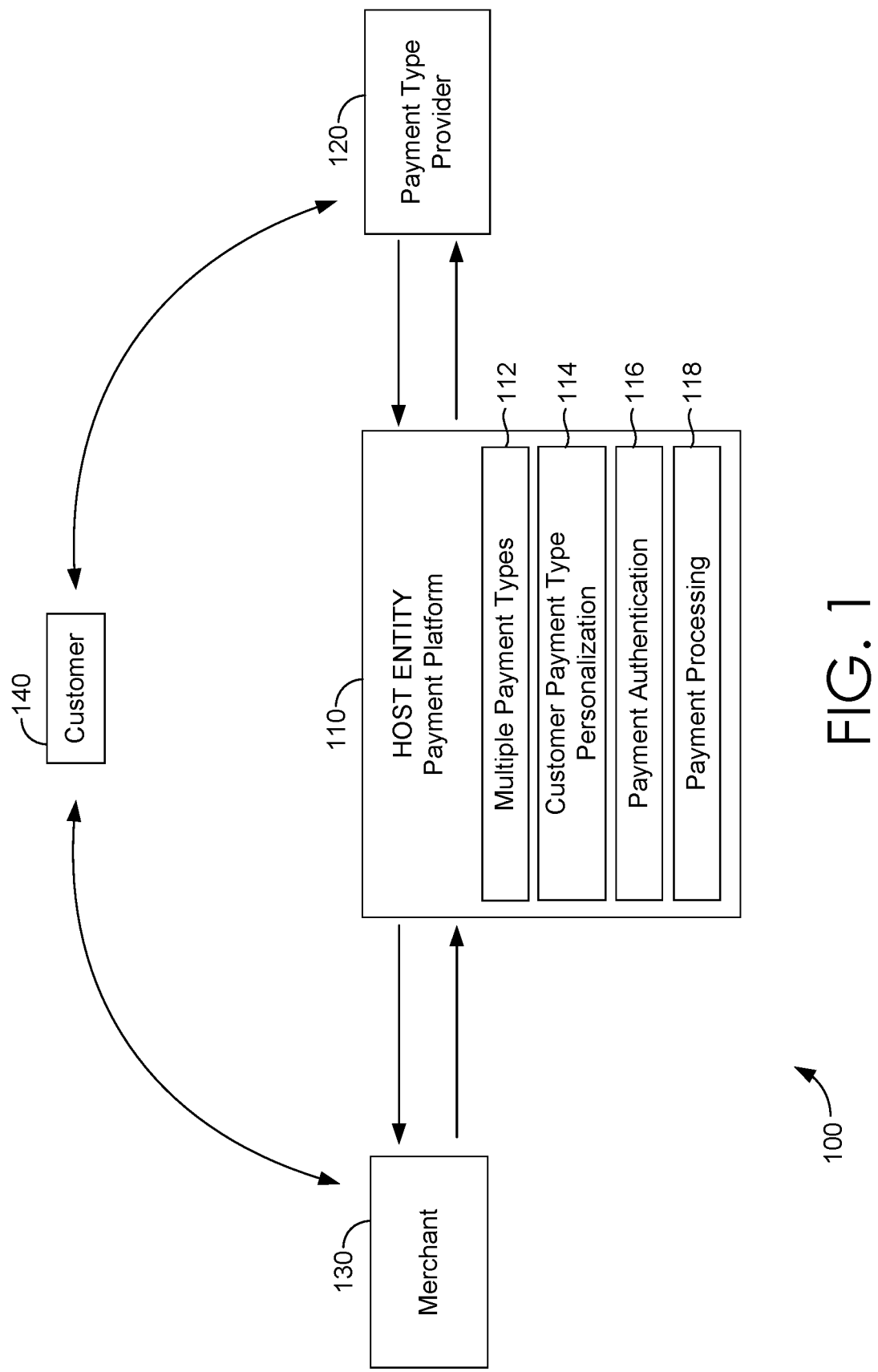
FIG. 1 is a block diagram of an exemplary operating environment in which embodiments described herein may be employed.

Online payment systems ("payment system") facilitate electronic payment for online transactions to merchants. Online merchants ("merchant") sells to good and services to customers via one or more online platforms. Payment systems ("payment method" or "payment type") can include credit cards, debit cards, electronic wallets (e-wallets), net banking, digital assets (BITCOIN) and so on. Payment systems are backed by different payment type providers (e.g., AMEX credit card, GOOGLE e-wallet, ALIPAY etc.). A merchant may make several payment types available to customers shopping on the merchant's online platform (e.g., website or mobile application).

Conventional methods for providing support for multiple payment types have met with issues that limit conversion on checkout pages. For example, checkout pages are designed with manual selectable options (e.g., buttons, drop-downs, or selectors) for a seemingly endless listing payment type options for selection. Some examples of payment type providers include VISA; V-PAY; MASTERCARD; MAESTRO; AMEX; DINER CLUB; DISCOVER; JCB; UNION PAY; CLICKANDBUY; NETELLER; PAYPAL; PAYSAFECARD; SEPA BANK TRANSFER EUR; SKRILL; SMS IVR; UATP; UKASH; and WESTERN UNION, amongst others.

Electronic wallet services also have issues with conversion. Electronic wallet services operate as funnels for payment types allow a customer to add many payment types to a wallet that then funnels payments to the merchant. The merchant can then integrate the single option electronic wallet service with indifference to the particular payment types within the electronic wallet. The electronic wallet services are also deficient in that they add a new intermediary where the customer is required to maintain two relationships (the electronic wallet service and their trusted payment provider of choice) instead of one (i.e., the trusted payment type provider).

Furthermore, customer online shopping platforms (e.g., web browsers, mobile operating systems, and mobile apps) allow customers to save their favorite payment credentials for use across merchants. This solution is also deficient at a high level, as a cross-channel issue, and specifically because a merchant's website or application must support every possible platform while the customer must add the same payment information and credentials to every platform they use. As such, existing methods for providing support for multiple payment type experiences fall short of significant improvement to conversion on checkout pages. A comprehensive solution would improve merchant systems, payment type provider systems, and customer online experiences.

Embodiments described herein provide methods and systems for providing a payment platform that implements payment interface services for online systems. The payment platform leverages payment type provider systems, merchant systems, and information of the customer to provide payment services (e.g., multiple payment types (payment methods) from payment type providers, customer payment type personalization, payment authentication, and payment processing) via a merchant's online platform (e.g., website or mobile application). A payment interface provider manages the implementation of a multi-payment type provider service and the relationship with the payment type providers so that the merchant may not have to directly maintain them. The payment interface provider allows merchants to subscribe to the payment interface and have access to the different payment interface services available through the payment interface. The payment platform supports many different payment type providers and their corresponding payment types, customer payment type personalization, payment authentication, and payment processing, as described herein, to provide functionality that the merchant might otherwise not have access to or have resources to provide to their customers.

Figure 2:
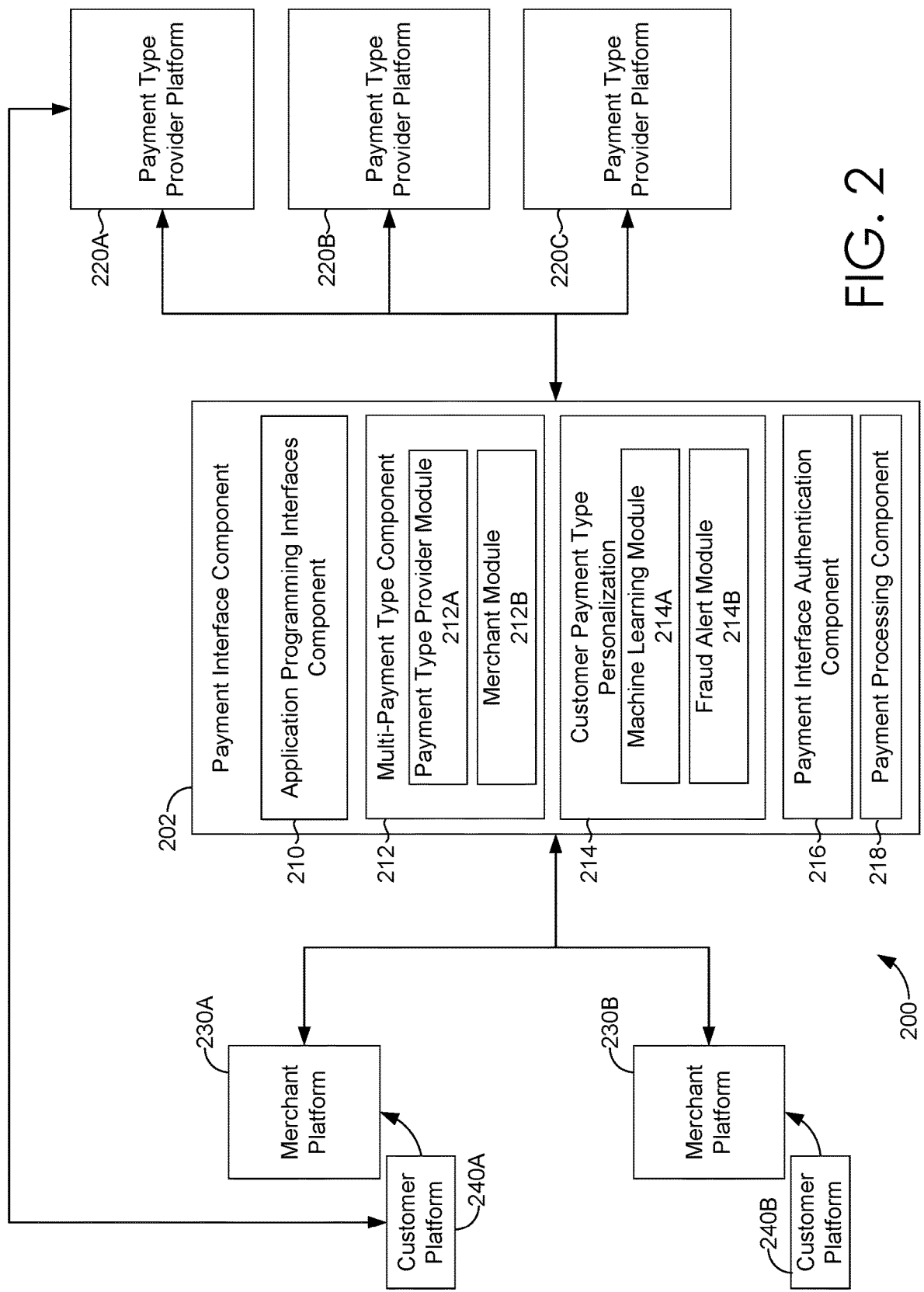
FIG. 2 is a block diagram of an exemplary implementation of a payment platform with a payment type provider platform and a merchant platform, in accordance with embodiments described herein.

Accordingly, with reference to FIG. 2, the payment platform 200 is an integrated modular payment service based on Application Programming Interfaces of the payment interface component 202. The payment platform 200 includes the payment interface component 202 having Application Programming Interfaces (APIs) 210, multi-payment type component 212 (having a payment type provider module 212A and a merchant module 212B), customer payment type personalization component 214, payment interface authentication component 216, and payment processing component 218; payment type provider platforms (220A, 220B and 220C), merchant platforms (230A and 230B) and customer platforms (240A and 240B). A platform as used herein refers to any system, computing device, process, or service or combination thereof. A platform may be implemented as hardware, software, firmware, a special-purpose device, or any combination thereof. A platform may be integrated into a single device or it may be distributed over multiple devices. The various components of a platform may be co-located or distributed. The platform may be formed from other platforms and components thereof.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The payment interface component 202 operates with merchant platforms and payment type provider platforms that standardize and customize the implementation of configurable payment services based on the payment interface APIs 210. APIs 210 can facilitate standardized communication between systems through interfaces using protocol-based (e.g., Hypertext Transfer Protocol) messaging having defined structures for request and response messages. The defined structures can facilitate generating messages that include customer data at the payment type provider platform. The customer data (e.g., customer payment type preference data, payment type provider customer data, and customer payment type historical data) can be communicated to support a range of payment interface services. In embodiments, the defined structures can be such that payment type provider customer data (e.g., account info, payment info, temporary authorizations, payment authorizations, and marketing communications) can be retrieved and communicated via a graphical user interface during checkout. For example, at the checkout page the customer is able to see and compare their account balance, available credit and financing offers from each of the payment types displayed at the checkout page. Today, the customer would have to log into their account for each of the payment types to compare this information. The services and corresponding functions can be written based on the APIs supported via the Application Programming Interfaces component 210 such that the functionality defined herein can be performed on different merchant platforms and payment type provider platforms. The payment interface provider can acquire and integrate new payment type providers, payment types and other features into the payment platform and make them available via the payment interface. Other variations and combinations of integrating components and protocols for communications as defined by APIs are contemplated with embodiments described herein.

The multi-payment type component 212 is responsible for facilitating communication with the payment type provider platforms and the merchant platforms to support payment interface services. The multi-payment type component 212 can operate with payment type providers using the payment type provider module 212A and merchant using a merchant module 212B. The multi-payment type component 212 (via the payment type provider module 212A) initializes communication channels with payment type providers for integrating payment types to accept payment via the payment platform. The communication channel can be used to provide access to and retrieve information from different payment types (e.g., credit cards, e-wallets, net banking, digital assets, etc.) of the payment type providers. The multi-payment type component 212 maintains communication channels with a plurality of payment type providers that are added to the payment platform. The multi-payment component 212 also maintains the communication channel to communicate messages for implementing other services (e.g., customization, security, and payment processing) with the payment interface.

The multi-payment type component 212 (via the merchant module 212B) also operates as a mechanism for managing merchants' platforms to have access to the payment interface component 202. The merchant module 212B can be responsible for tracking (e.g., receiving and registering) merchant subscriptions to the payment interface. The multi-payment component 212 communicates with a plurality of merchant platforms to support access to different payment type providers. The multi-payment type component 212 can provide an interface for a merchant to retrieve and implement APIs that are used in standardizing and customizing a checkout page on merchant platforms for supporting functionality described herein. Other variations and combinations of establishing interactivity, via the multi-payment type component 212, between the payment interface component 202 and the plurality of payment type provider platforms (220A, 220B, and 220C) and the merchant platforms (230A and 230B) are contemplated with embodiments described herein.

The merchant platform (e.g., merchant platforms 230A and 230B) operates to communicate information with the payment interface component 202 and receive information at the merchant platform. The merchant platform can operate with the payment interface component 202 to communicate information for implementing the payment interface services. The merchant platform can provide an interface for the user to buy from the merchant and for the merchant platform to receive information of the customer (e.g., a payment type selected, email address, address, phone number, and transaction details—items bought, prices, taxes, etc.) that can be selectively used with the different payment interface services. The merchant platform can be implemented, at least in part, using APIs supported via the Application Programming Interfaces component 210 of the payment interface component 202. For example, the APIs can be used in standardizing and customizing a checkout page on the merchant platform. A customer accesses the merchant's website, prepares to buy from the merchant, and indicates that they are ready to checkout. The merchant platform also uses the APIs to generate interface features on the checkout page for authentication and payment processing services for the customer to complete the customer transaction, as discussed herein in more detail.

In embodiments, the merchant platform can receive customer payment type personalization information (e.g., personalized payment types) from the payment interface component 202. The merchant platform can embed payment interface service components to facilitate communicating and providing the payment interface services via the merchant platform. The merchant platform can generate interface features for checkout processing based on personalization of payment types identified using information of the customer. For example, customer email, phone number, and other customer-provided identifying detail can be captured for a customer and communicated, at any time or possibly when an indication to checkout is received, to the payment interface component 202. The customer email and transaction details can be communicated as part of a request to personalize payment types for the customer. In another exemplary implementation, the payment interface has access to information that is automatically collected by client-side libraries (in, e.g., the browser, mobile app, etc.) including IP address, browser cookies, etc. Communicating the request causes the payment interface to identify payment types relevant to the customer (e.g., a subset of payment types integrated at the payment interface) for the customer or a default payment type for the customer.

Based on the relevant payment types received, the checkout page may solicit additional information from the customer or continue with payment authentication and payment processing services via the payment interface. For example, when a subset of two or more payment types relevant to the customer are identified, the subset of two or more payment types can be caused to be displayed and the customer is prompted to choose a payment type (e.g., a chosen payment type). As another example, the customer may provide after payment type selection additional necessary information as specified by the payment type at enrollment time. In other embodiments, based on additional factors and processing, a default payment type is chosen for the customer and the transaction is processed based on the default payment type that is automatically chosen on behalf of the customer. The merchant platform can also support communication for executing payment authentication. For example, providing an interface to type an SMS code during an authentication process of the payment interface security service. Also, when security processing is completed between a payment type provider platform and the customer platform (e.g., mobile device), the payment type provider platform communicates to the payment interface component and in turn the merchant platform to complete payment processing.

The payment interface component 202 further includes the customer payment type personalization component 214. The customer payment type personalization 214 operates to facilitate personalization of payment types for a customer. A personalization process can include discovering, selecting, and choosing payment types for a customer. The personalization process can be based on one or more set of rules or step-by-step processes and automated processes performed independently or together.

The customer payment type personalization component 214 can receive a request to personalize payment types for a customer. It is contemplated that the request to personalize payment types can be triggered based on different activities of the customer at the merchant system. The request can also be communicated in combination with information of the customer that is pertinent to identifying payment types that are relevant to the customer. By way of example, a customer can complete selecting items to purchase and then elect to checkout and upon electing to checkout, a request to personalize payment types for the customer is communicated from the merchant platform; the request may include information of the customer (e.g., email address) when communicated to the payment platform. Other variations and combinations of triggers that cause the communication of the request to personalize payment types for a customer are contemplated with embodiments described herein.

The customer payment type personalization component 214 receives the request and then initiates a personalization process. In one embodiment, a discovery-query, based on one or more elements of information of the customer is generated. For security purposes, a security hash algorithm can be implemented with the information of the customer for the discovery-query to more securely identify and communicate payment type provider payment type matches for a particular customer. The discovery-query can be executed against different types of customer data resources (e.g., customer information database) to identify a payment type based on a match between the information of the customer and an entry in the customer data resource. The customer data resources can include internal and external data resources. The customer data can include customer payment type preference data, payment type provider customer data, and customer payment type historical data. Customer payment type preference data can include a preference of a payment type for particular kinds of transactions or other conditions identified by the customer. For example, a customer may explicitly configure a preference for a first payment type for all international purchases and a second payment type for all grocery store purchases. Payment type provider customer data can refer to information gathered at the payment type provider. Customers often have accounts with their payment type provider and as such this information can be retrieved by the payment platform for customer payment type personalization. In some embodiments, payment type provider customer data (e.g., account info, payment info, temporary authorizations, payment authorizations, and marketing communications) can be retrieved and communicated via the graphical user interface during checkout. Historical data include a database of information of the customer and the payment types the customers have used in the past and corresponding transaction details. The database of a payment type provider can include information of the customer, where the customer has a nexus or established relationship with the payment type provider. The discovery-query can be executed against any of the one or more customer data resources. For example, a customer email address can be communicated to the plurality of payment type providers to determine whether a match between the customer email address and an email entry in the payment type provider database exists.

In embodiments, a combination of information of the customer can be used to identify exact matches or near matches with payment type providers. The discovery-query or selection method can combine a set of information of the customer and based on a set of heuristics and threshold based computations, determines payment types are relevant to a customer. For example, the type of merchant, location of purchase, date of purchase, total cost of purchase and other information of the customer, transaction details and merchant information can be part of heuristic-based shortcuts for determining relevant payment types. It is contemplated that thresholds may be implemented for the personalization process. In particular, thresholds can be associated with algorithms that are used for discovering and selecting payment types. For example, when a combination of information of the customer is used, a calculation to select or not select a particular payment type during discovery or selection can be based on the payment type meeting a threshold defined using the calculation. Further, for a set of relevant payment types discovered for the customer, the most relevant payment types can also be identified such that not all relevant payment types are displayed but only payment types that meet the threshold requirement can be communicated for display to a customer. Selecting a default payment type or selecting a subset of payment types that are relevant can be based on factors that optimize revenue for the merchant (e.g., revenue being a function of conversion and payment cost, as discussed herein). Other variations and combinations of methods for identifying a subset of payment types from a plurality of payment types of a payment interface are contemplated with embodiments described herein. As discussed, the output of the payment type lookup (i.e., discovery-query and selection) can result in a single default payment type or a short list of smart fallback payment types. The single default payment type can be automatically chosen for the customer or the short list of payment types can be presented to the customer via the merchant checkout page for the customer to then choose a preferred payment type.

In embodiments, customer payment type personalization component 214 includes a machine learning module 214A utilized in determining the set of relevant payment types for a customer. In certain aspects, the machine learning module 214A includes at least one algorithm selected from the following non-limiting examples: Random Forest, Classification and Regression Tree, boosted tree, neural network, support vector machine, general chi-squared automatic interaction detector model, interactive tree, multi-adaptive regression spline, and naïve Bayes classifier. The machine learning module can be used to determine, for a given customer, the relevancy of each payment type provider that is in communication with the multi-payment type component 212 based at least in part on a prediction of the probability or likelihood of the customer using that payment type to complete a transaction. This likelihood can be mapped to a standard scale (e.g., between 0.0 and 1.0), such that predictions can be made for each of multiple different payment types and then the multiple different payment types can be ranked ordered by their decreasing likelihood of being used to complete a transaction, based upon their respective probabilities of the customer using that payment type to complete the transaction. Where the customer has two or more available payment instruments for a given payment type (e.g., VISA), such predictions may also be made on a payment instrument basis (e.g., a customer has both a BARCLAYCARD VISA and a CAPITAL ONE VISA). In embodiments, all payment types having a likelihood of being used to complete a transaction that is equal to or greater than a threshold (e.g. 0.5, 0.7, or 0.9 on a 0.0 to 1.0 scale) may be included in the set of relevant payment types for the customer. The specific threshold may vary merchant to merchant, and an individual merchant may specify the threshold above which payment types should be included. In certain aspects, the threshold for a merchant is determined by examining historical transaction data, predicting for each completed transaction the probability of that customer using that payment type to complete a transaction, and determining a threshold such that all or substantially all of the payment types used to complete the past transactions would have been above the threshold and shown to the customer as being relevant.

To determine the probability or likelihood of a given customer using a particular payment type to complete a transaction, the machine learning module 214A may create or utilize one or more models. For example, models can be constructed about this particular customer (e.g., the customer platform 240A), customers that share similar characteristics to this customer (e.g., are from a similar geographic region and use a similar type of computing device), this particular merchant platform (e.g., merchant platform 230A), merchants that share similar characteristics to this merchant platform (e.g., sell similar goods and are in a similar geographic location), or across all merchant platforms (e.g., 230A, 230B, etc.) that are integrated with the payment platform 200. Models can at least partially be created offline using a customer's payment history across multiple merchants that have integrated with the payment platform 200, the customer's payment history with a particular merchant platform (e.g., merchant platform 230A), historical data for customers that share similar characteristics to this customer that have transacted with merchant platform 230A using payment platform 200, historical data for all customers that have transacted at merchants similar to merchant platform 230A using payment platform 200, and historical data for all customers that have transacted using payment platform 200, among other things. Such offline models can be augmented by real-time classification of a new customer platform (e.g., customer platform 240B) using, for example, session data and transaction data.

The specific models used for a predicting the likelihood of a customer using a specific payment type at a specific merchant may vary based on factors such as whether the customer has been uniquely identified (e.g., using identifying detail like customer email, phone number, user id (UID)), the extent to which information about the customer can be automatically collected (e.g., using cookies, client-side libraries), the extent to which the customer has transacted with this merchant or similar merchants in the past, and other factors. Models can be constructed for varying levels of specificity, including at the individual customer level, cohort level in which customers sharing similar characteristics are grouped, merchant level, and merchant cohort level in which customers sharing similar characteristics are grouped. Each of these models can be created using multiple attributes, including attributes drawn from Table 1, which provides an example list of attributes that can be used identifying payment types relevant to a customer.

TABLE 1

Example Attributes

| Attribute | Description |
| --- | --- |
| Abandonment Frequency | Indicates the fraction of transactions in which this customer has been identified and does not complete the purchase |
| Average Steps Preceding Abandonment | The customer's average number of events preceding an abandonment (i.e. 0 when the checkout occurs, 1 for the pageview immediately preceding the abandonment, etc.) |
| Average Time on Site Preceding Abandonment | The customer's average session time preceding an abandonment |
| Average Time on Site Preceding Purchase | The customer's average session time preceding a completed purchase |
| Abandonment Frequency for Payment Type | For each payment type, the fraction of transactions in which the customer selected that payment method but did not complete the purchase |
| UID | UID of the user |
| GUID | GUID of the user |
| Browser | Browser being used by customer |
| Device | Device type of user (e.g., computer, mobile) |
| Log-In State | Logged-in, logged-out, or identified |
| Session Average Item Price | Average price of items in cart |
| Session STD Item Price | Standard deviation of item costs |
| Session Min Item Price | Minimum price of items in cart |
| Session Max Item Price | Maximum price of items in cart |
| Session Item Count | Number of items in cart |
| Merchant Average Item Price | Merchant's average per-item selling price, across all customers |
| Merchant STD Item Price | Merchant's average standard deviation of item costs, across all customers |
| Merchant Min Item Price | Merchant's average minimum item price in completed transactions, across all customers |
| Merchant Max Item Price | Merchant's average maximum item price in completed transactions, across all customers |
| Merchant Item Count | Merchant's average number of items in completed transactions |
| Merchant's Most Used | The payment type most used at this merchant, across all customers. Separate attributes for the most used over the past 7 days, 30 days, 60 days, 90 days, 180 days, 365 days. |

TABLE 1-continued

Example Attributes

| Attribute | Description |
| --- | --- |
| Merchant's Least Used | The payment type least used at this merchant, across all customers. Includes only those payment types used at least 1 time. Separate attributes for the least used over the past 7 days, 30 days, 60 days, 90 days, 180 days, 365 days. |
| Cohort's Most Used at Merchant | The payment type most used at this merchant, across customers similar to current customer. Separate attributes for the most used over the past 7 days, 30 days, 60 days, 90 days, 180 days, 365 days. |
| Cohort's Least Used at Merchant | The payment type least used at this merchant, across customers similar to the current customer. Includes only those payment types used at least 1 time. Separate attributes for the least used over the past 7 days, 30 days, 60 days, 90 days, 180 days, 365 days. |
| Last Used | The payment type last used by this customer |
| Use Streak | The number of transactions in a row by this customer using the same payment type |
| Most Used | The most frequently used payment type for this customer. Separate attributes for the most used over the past 7 days, 30 days, 60 days, 90 days, 180 days, 365 days. |
| Credit Available on Most Used | The amount of credit available on the customer's most used payment type |
| Least Used | The least used payment type for this customer. Includes only those payment types used at least 1 time. Separate attributes for the least used over the past 7 days, 30 days, 60 days, 90 days, 180 days, 365 days. |
| Time Since Last Use | Time since a specific payment type (e.g., ALIPAY) was used by this customer |
| Last Used in Category | The payment type last used by this customer, in this merchant category |
| Use Streak in Category | The number of transactions in a row by this customer using the same payment type, in this merchant's category |
| Last Used at Merchant | The payment type last used by this customer, at this merchant |
| P1 Success | For each payment type, the fraction of transactions in which the payment type was presented first in a list to the customer, and was selected as the payment type |
| P2 Success | For each payment type, the fraction of transactions in which the payment type was presented second in a list to the customer, and was selected as the payment type |
| Loyalty | Whether this customer has a loyalty program coupled to a particular payment type for this merchant or merchant category |
| Cross-border | Whether the merchant and the customer are located in the same country |
| Language | Default language used by this customer |
| Home Country | Customer's home country |
| Most Used in Country | The most frequently used payment type for customers from this country. Includes only those payment types used at least 1 time. Separate attributes for the most used over the past 7 days, 30 days, 60 days, 90 days, 180 days, 365 days. |
| IP Country | Country of origin for current session |
| Session Language | Language used for current session |

In some embodiments, a Random Forest algorithm may be used in determining the set of relevant payment types for a customer. Random forest can be an ensemble learning method for classification, regression and other tasks, that operate by constructing a multitude of decision trees at training time and outputting the class that is the mode of the classes (e.g. classification) or mean prediction (e.g. regression) of the individual trees. As an ensemble method, Random Forest can combine one or more 'weak' machine-learning methods together. Random Forest can be used in supervised learning (e.g. classification and regression), as well as unsupervised learning (e.g. clustering). For each payment type, the random forest approach may be used in binary classification mode in which the probability of that given payment type being relevant is mapped to between 0 and 1. Using Random Forest, three phases of model construction and evaluation can be employed: testing, training, and prediction. By way of example, a testing phase may be employed in which historical data about the customer, such as all transactions completed in 2015, is used to make a model for each of the payment types. These models can be tested using other historical data, such as all transactions completed in 2014. Once validated, the models may be used in prediction, to predict on new or live data the probability or likelihood of the customer using a payment type to complete a transaction. In constructing a model, the optimal combinations of attributes (e.g., attributes listed in Table 1) can first be selected by growing numerous cross-validated classification trees for subsets of attributes, with each tree used to predict relevance for each payment type. These are counted as the tree votes for that group. The forest chooses the group membership having the most votes over all the trees in the forest. Each such tree is grown by cross-validation; where a training set (approximately two-thirds of the values) is randomly selected from the full data and each tree is grown on this training data to the largest extent possible (no pruning). The resultant tree is then used to predict the group membership for the remaining test cases, which is termed as an out-of-bag (OOB) prediction. This process is then repeated multiple times (e.g., 1000 times); that is, another training set is randomly selected and a new tree is grown and used to perform another OOB prediction. The classification accuracy of the random forest is measured by the averaged error of the OOB predictions across the entire forest; this is termed the OOB error rate. The OOB error thus uses disjoint subsets of the data for model fitting and validation repeatedly. This cross-validation is also used to compute a variable importance for each attribute included in the Random Forest analysis. The stepwise selection method sequentially searches for optimal subset of attributes where the attribute with the lowest variable importance score from the Random Forest is removed at each step.

Ensemble methods may also be provided in embodiments. In statistics and machine learning, ensemble methods can be used multiple learning algorithms to obtain better predictive performance than could be obtained from any of the constituent learning algorithms. In an example, five models are generated and combined to create one prediction, with two models built using logistic regression methods, one build using regular random forest, one built using balanced random forest, and one built using support vector machine. Each is trained to predict the probability or likelihood of a given customer using that payment type to complete a transaction, using attributes including at least some of those listed in Table 1. These five models can then be ensembled together to deliver a single champion result that can have more power to capture data feature and provide a better prediction accuracy than any one model individually. In some embodiments, a loop can be provided to assign a specified weight on each model. Models can be combined using conditional probabilities on permutations, using a purely Bayesian methodology and/or using cross-validation, etc. A weight loop can be applied on testing data to search for the optimal combination of different models.

In embodiments, the machine learning module 214A can also be used to predict the likelihood of a customer actually completing the transaction, for each payment type provider in communication with the multi-payment type component 212. That is, predictions can be generated that enable comparisons of the expected conversion rate for a first payment type compared to a second, third, fourth, etc. payment type. The payment platform can then compute an expected fee for each of the payment types to maximize the revenue for the merchant.

In embodiments, the payment types communicated to the customer and a corresponding selected payment type selected could be used as a fraud alert mechanism implemented using the fraud alert module 214B. The fraud alert module 214A determines whether a particular transaction is likely fraudulent (e.g., unauthorized or unlawful) and performs one or more fraud protection operations if a determination is made that the transaction is potentially fraudulent. At a high level, the relevant payment types determined for a customer, for a particular transaction, can be associated with a selection power index that indicates a probability or likelihood of a payment type being selected for the particular transaction. For example, a selection power index can be high for a first payment type indicating a high likelihood of being selected and the selection power index can be low for a second payment type indicating a low or no likelihood to be selected. The high likelihood and low likelihood to be selected can inversely correspond to a low likelihood of fraud and a high likelihood of fraud.

The selection power index associated with particular payment types can be defined in an algorithm for determining the relevant payment types. The algorithm can identify a first payment type and a second payment type that are associated with the customer and corresponding selection power index. The algorithmically determined selection power index can indicate that there is a high likelihood that the customer would select the first payment type for a particular transaction and a low likelihood that the customer would select the second payment type for the transaction. For example, based on customer payment type preference data, payment type provider customer data, and customer payment type historical data a selection power index can be determined both payment types. Both payment types can be displayed as relevant payment types. If the customer selects the second payment type having a low likelihood of being selected, this might trigger fraud protection operations because the selected payment type is not the more likely payment type to be chosen by the customer for the transaction. Fraud protection operations may include additional verification questions to further authenticate the customer and an SMS or call to the customer to do the same. As such, the relevant payments types and the selection power index known for the relevant payments types can be leveraged as part of a fraud alert mechanism.

The payment interface authentication component 216 is responsible for facilitating security for the customer transaction via an authentication process. The authentication process begins upon the payment interface authentication component 216 receiving a chosen payment type. The authentication process is part of the payment authentication service that provides improved security for payments processing. The payment interface security component can communicate with the payment type provider platform of the chosen payment type in order to initiate an authentication process supported at the payment type provider with the customer platform. In this regard, the authentication process can be implemented based on direct communication between the payment type provider and the customer, where the customer trusts their chosen payment type provider. The payment interface security component can communicate information of the customer from received from the merchant component; the information of the customer (e.g., transaction details) is information that is needed to implement authentication process. The payment type providers that are part of the payment platform can support several different authentication processes. By way of example, the authentication process can be a mobile-based authentication process that uses a one-time code to provide strong, per-transaction authentication.

The authentication process can be configured to have a primary workflow and a fallback workflow. The specific choice of primary and fallback flows may be made by the payment type provider, and the merchant system may choose to only support some authentication flows from the list of those that the payment platform enables. For example, the mobile-based authentication, in operation, includes the payment platform pushing via a push notification the information of the customer to a mobile application on the customer's mobile device. The customer can then open the application on the customer platform in response to the push notification and then authenticate the transaction. The customer can authenticate the transaction using an authentication mechanism (e.g., PIN, finger print or other authentication options). In a fallback workflow, for example a customer who does not have the payment type provider's mobile application installed, the authentication process can be based on a SMS-based authentication process. In operation, the payment type provider platform sends an SMS to the customer's platform with the information of the customer and then provides an authentication code that the customer then types in the checkout page to the approve the transaction. The payment type provider platform operates with the payment interface security component and merchant platform when an SMS code is to be received at the merchant platform such the merchant platform is caused to display an interface to receive the SMS code and the SMS code is communicated to be matched at the merchant component or the payment interface security component and through to the payment type provider platform. Other variations of authentication processes are contemplated within the payment platform in accordance with embodiments described herein.

The payment processing component 218 is responsible for managing payment processing. The interface between the merchant system and payment processing component is standard and independent of payment type. The payment processing component 218 communicates with the payment type provider platform to complete payment. Once the customer has authenticated the transaction, the payment processing component can initiate payment processing to cause the funds from the transaction to be guaranteed to the merchant. Several payment processing schemes can be implemented to complete payment processing. In one example, the payment type provider platform debits the customer's account based on the transaction details received from the payment processing component 218 and settles the funds to payment interface provider who settles to the merchant. The payment processing component can be responsible for opening, tracking, and closing any transactions that are processed and completed. Other variations and combinations of payment processing are contemplated with embodiments described herein.

Figure 3A:
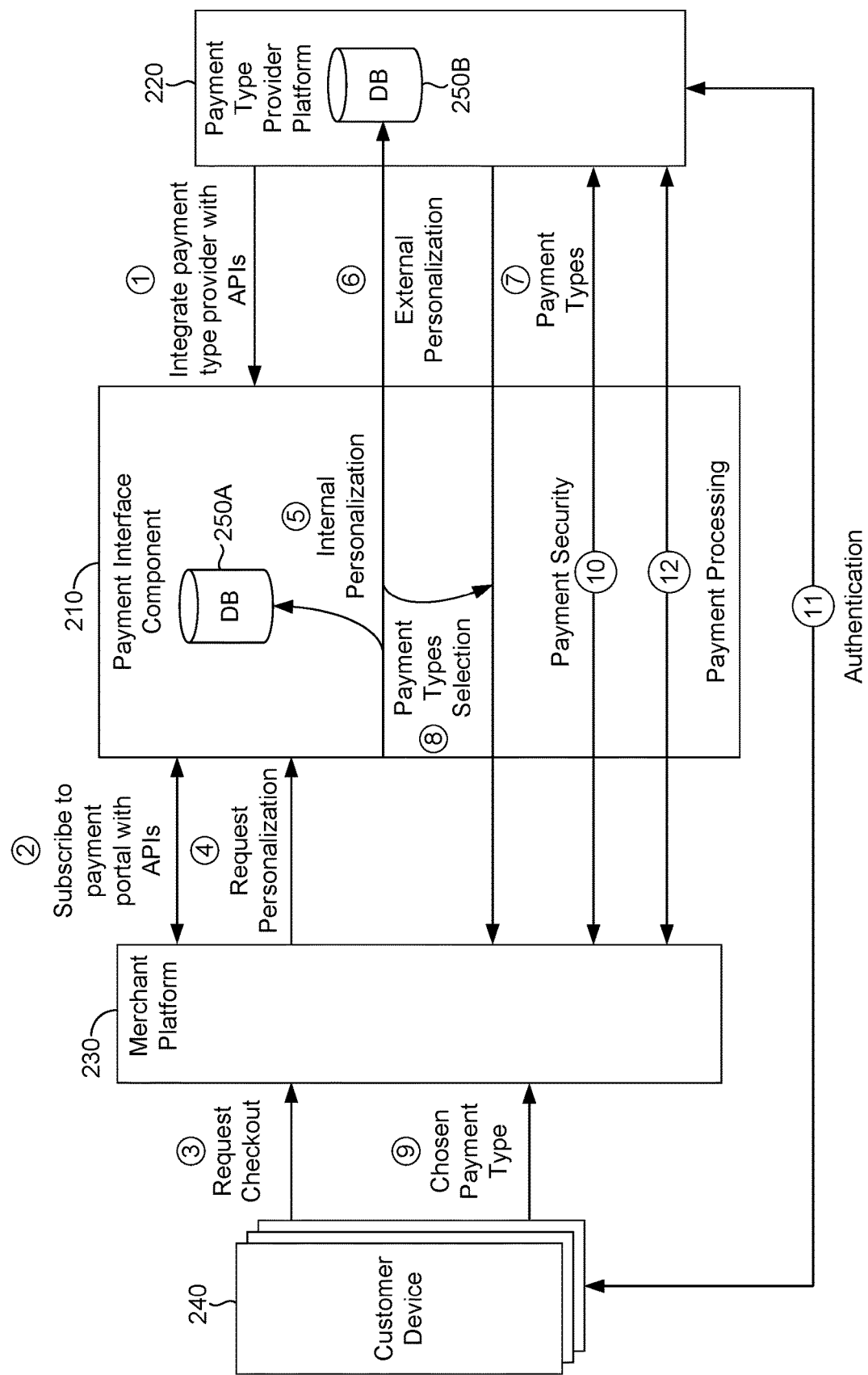

Turning now to FIG. 3A, a high level schematic is illustrated for implementing a method for providing payment interface services using a payment platform. Initially, at step 1, a payment interface component and a payment type provider platform 220 communicate to integrate the payment type provider with the payment interface component using APIs. In embodiments, a communication channel is established for facilitating messaging during implementation payment interface services. At step 2, the payment interface component 210 and the merchant platform 230 communicate to have the merchant platform subscribe to the payment interface component using APIs. At step 3, a customer using a customer device 240 accesses the merchant platform 230 to buy from the merchant and request to checkout. At step 4, based on the customer action to checkout, the merchant platform 230 requests personalization of payment types for the customer to complete payment processing. At step 5, the personalization process is performed based on internal customer data resources, such as database 250A and at step 6, the personalization process is performed based on external customer data resources, such as database 250B at the payment type provider platform 220. At step 7, a payment type that is discovered at the payment type provider platform 250B is communicated to the payment interface component 210. At step 8, payment types that are discovered, internally and externally, are evaluated to select one or more payment types to be presented to the customer. It is contemplated that a default payment type can be selected as the chosen payment type and automatically used for payment processing; however as shown at step 9, multiple payment types can be selected and presented to the customer to cause the customer to choose a chosen payment type. At step 10, upon identifying a chosen payment type, a payment authentication service is initiated with the payment provider, at step 11, the payment type provider platform 220 communicates with the customer device 240 to implement authentication. The authentication service may involve direct communication between the payment type provider platform 220 and the customer device 240. The authentication can be implemented with one of a primary authentication workflow or a secondary authentication workflow. At step 12, upon authentication, payment processing is initiated to settle funds between the customer, the payment type provider and the payment interface.

Figure 3B:
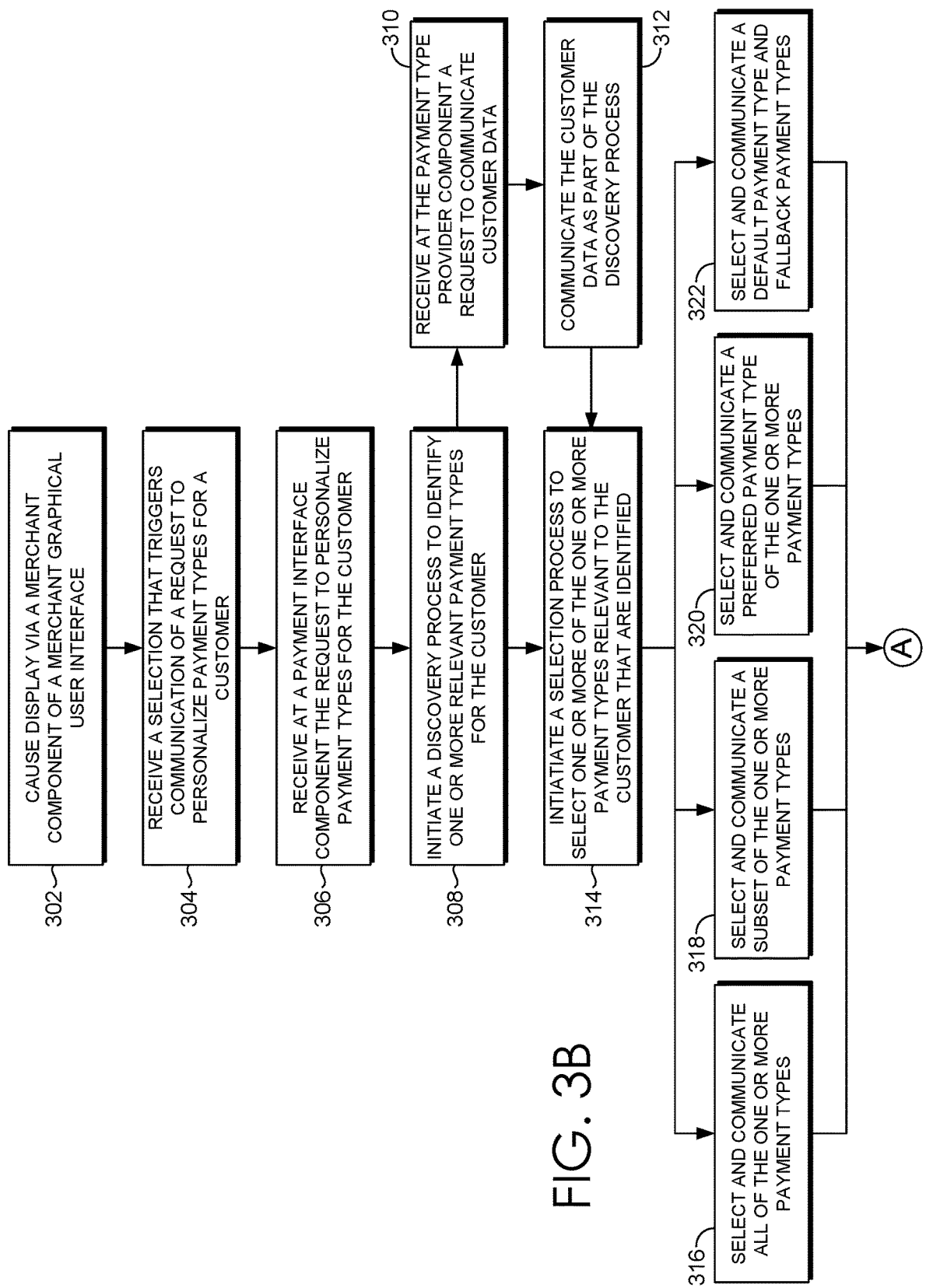
Figure 3B:
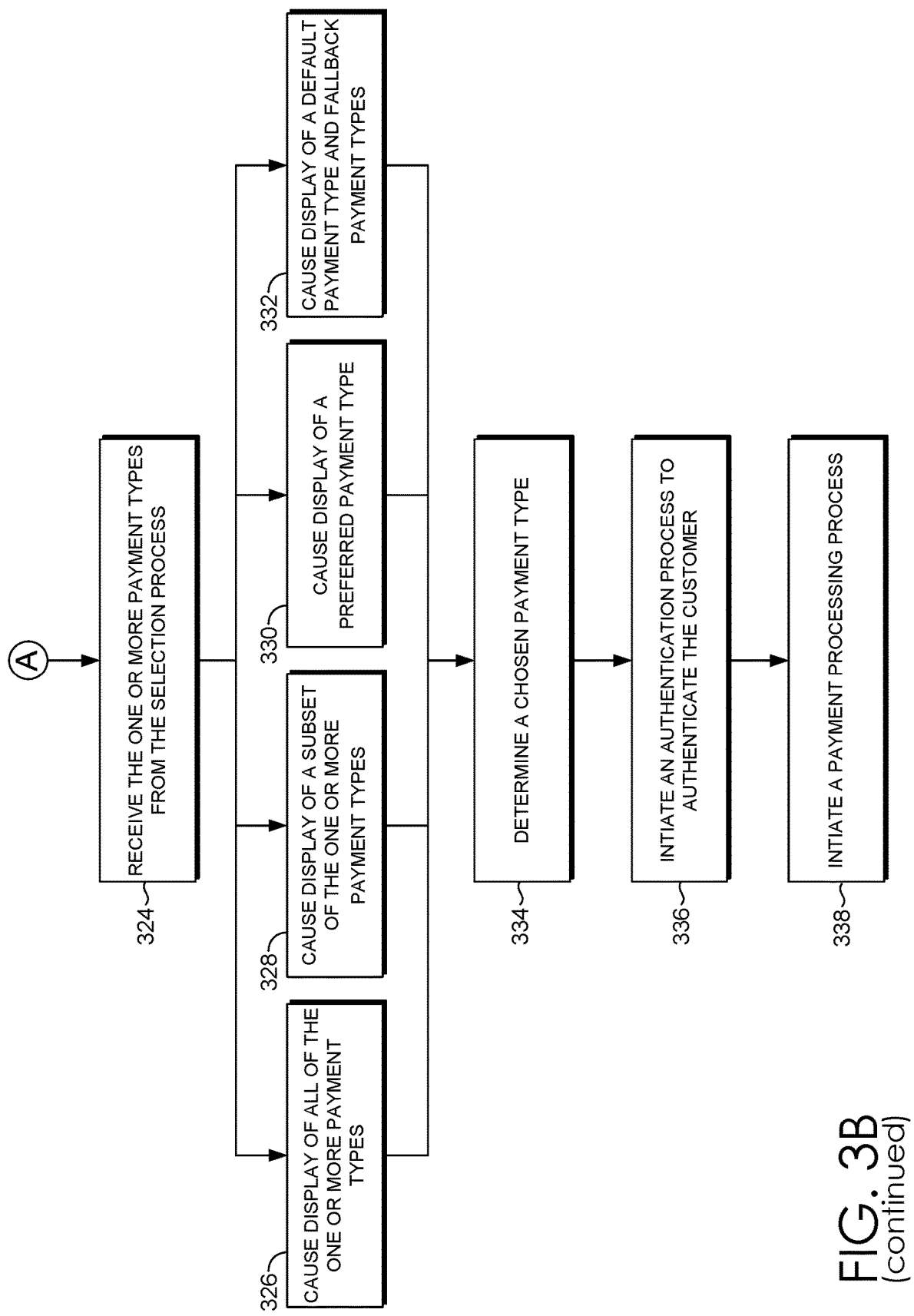

Turning now to FIGS. 3B and 3C, that illustrate high level schematics and corresponding graphical user interfaces for implementing a method for providing payment interface services using a payment platform. In particular, a computer implemented method for implementing payment interfaces via graphical user interfaces is also provided. At block 302, a merchant component causes display of a merchant graphical user interface (e.g., checkout graphical user interface). The merchant graphical user interface is associated with a customer using a merchant online commerce system. The merchant graphical user interface includes information of the customer (e.g., merchant customer data and transaction details). The merchant graphical user interface includes a graphical user interface element that when selected triggers a communication of a request to personalize payment types for the customer. Personalizing the payment types for the customer includes identifying payment types that are relevant to the customer based at least in part on the information of the customer.

At block 304, the merchant receives a selection via the merchant graphical user interface that triggers communication of the request from the merchant component to a payment interface component. The merchant component and the payment interface component communicate based on an interface that provides the merchant component access to a plurality of payment types integrated at the payment platform. At block 306, the payment interface component receives the request to personalize payment types for the customer. At block 308, the payment interface component initiates a discovery process to identify one or more relevant payment types for the customer. The discovery process includes accessing one or more customer data resources to determine payment types that are relevant to the customer. The customer data resources are accessed based on an interface comprising communication channels that integrate the payment interface component with a plurality of payment type provider components.

At block 310, the payment type provider component receives a request to communicate customer data as part of the discovery process and at block 312, communicates the requested data. The payment interface component, based on accessing the one or more customer data resources through the interfaces, can determine, from a plurality of payment types integrated at the payment platform, one or more payment types that are relevant to the customer. At block 314, the payment interface component initiates a selection process to select one or more of the one or more payment types relevant to the customer to communicate to the merchant component. The merchant component will then cause display of the one or more selected payment types, on the merchant graphical user interface.

The payment interface component can optionally select and communicate the one or more selected payment types in the following ways: at block 316 communicates all the payment types relevant to the customer, at block 318 communicates a subset of the relevant payment types, at block 320, communicates a preferred payment type, and at block 322 communicates a default payment type and short list of smart fallback payment types. In an embodiment (not shown), the payment interface component can instead communicate a preferred payment type and automatically proceed to either block 336 or block 338 without any further explicit action by the user.

At block 324, the merchant component receives the one or more payment types from the selection process and causes the one or more payment types to be displayed on the merchant graphical user interface. The one or more payment types are displayed to be chosen for payment processing. The merchant graphical user interface can display the one or more payment types based on corresponding payment types from the selection process. At block 326, corresponding to block 316, all the payment types that are relevant to the customer are displayed; at block 328, corresponding to block 318, a subset of payment types relevant to the customer are displayed; at block 330, corresponding to block 320, a preferred payment type is displayed; and at block 332, corresponding to 322, a default payment type and a short list of smart fallback payment types are displayed. The customer may select a merchant graphical user interface element to indicate a selection of a payment type for payment processing.

At block 334, a chosen payment type is determined. A chosen payment type can be determined in several different ways. For example, when more than one payment type is selected, the customer can select a particular payment type for processing payment of the transaction. In another example, when one payment type is selected (e.g., preferred payment type, default payment type, etc.), the one payment type may automatically be the chosen payment type or in the alternative the customer may be prompted to confirm the one selected payment type before the one payment type is confirmed as the chosen payment type.

Upon determining a chosen payment type, the merchant component can communicate the chosen payment type to the payment interface component to, at block 336, initiate authentication of the customer for payment processing. In one embodiment, the payment interface component communicates with the chosen payment type provider such that a payment type provider component pushes, via a push notification, security information of the customer to a mobile application on the customer's mobile device. The customer's mobile device causes display on a graphical user interface, an authentication interface. The customer can authenticate the transaction using an authentication mechanism (e.g., PIN, finger print or other authentication options). The payment type provider component can communicate to the payment interface component successful authentication of the customer. At block 336, the payment interface component can initiate payment processing based on communicating with the payment type provider component to complete payment. Payment processing includes causing the funds from the transaction to be guaranteed to the merchant. Several payment processing schemes can be implemented to complete payment processing.

With reference to FIG. 3C, a merchant graphical user interface 350 is caused to be displayed via a merchant platform on a customer platform (e.g., mobile device) to provide access to a merchant platform. The merchant platform can support buying goods and services online. The customer platform supports accessing the merchant platform to make purchases. The merchant graphical user interface can be a shopping cart interface having a checkout button, the checkout button when selected, triggers communication of a request to personalize payment types for the customer. A discovery process is initiated at a payment interface platform to determine one or more payment types relevant to the customer. Upon determining the one or more payment types, a selection process is initiated to select and communicate one or more of the one or more payment types to the merchant platform. The selection process can include selecting and communicating all of the one or more payment types, a subset of the one or more payment types, a preferred payment type, and a default payment type with fallback payment types.

The merchant platform can receive the one or more selected payments type to cause display of the selected payment types in different ways. As shown, at 360A, causing all of the one or more payment types to be displayed; at 360B causing a subset of payment types to be displayed; at 360C causing a preferred payment types to be displayed; and at 360D causing a default payment type and fallback payment types to be displayed. It is contemplated that the merchant platform can further support different prompts to facilitate changing and selecting different payment options. For example, a preferred payment type can be configured such that it automatically continues to authenticate and perform payment processing. In the alternative, the preferred payment type can also be configured with a graphical interface element to override the preferred payment type from automatically being processed. The merchant graphical interface can also be used to display customer data. Some customer data (e.g., account info, payment info, temporary authorizations, payment authorizations, and marketing communications) is retrieved from the payment type provider and communicated via the merchant graphical user interface during checkout. For example, at the merchant checkout page the customer is able to see and compare their account balance, available credit and financing offers from each of the payment types displayed at the checkout page, in order to make an informed decision on which payment type to choose.

The merchant graphical interface can further support access to authentication graphical user interface 360. In one embodiment, a link from the merchant graphical interface may help launch a local application or a web interface for an authentication interface associated with the chosen payment type provider. The merchant component can also cause display of a payment complete interface 380 when payment has been completed.

Figure 4:
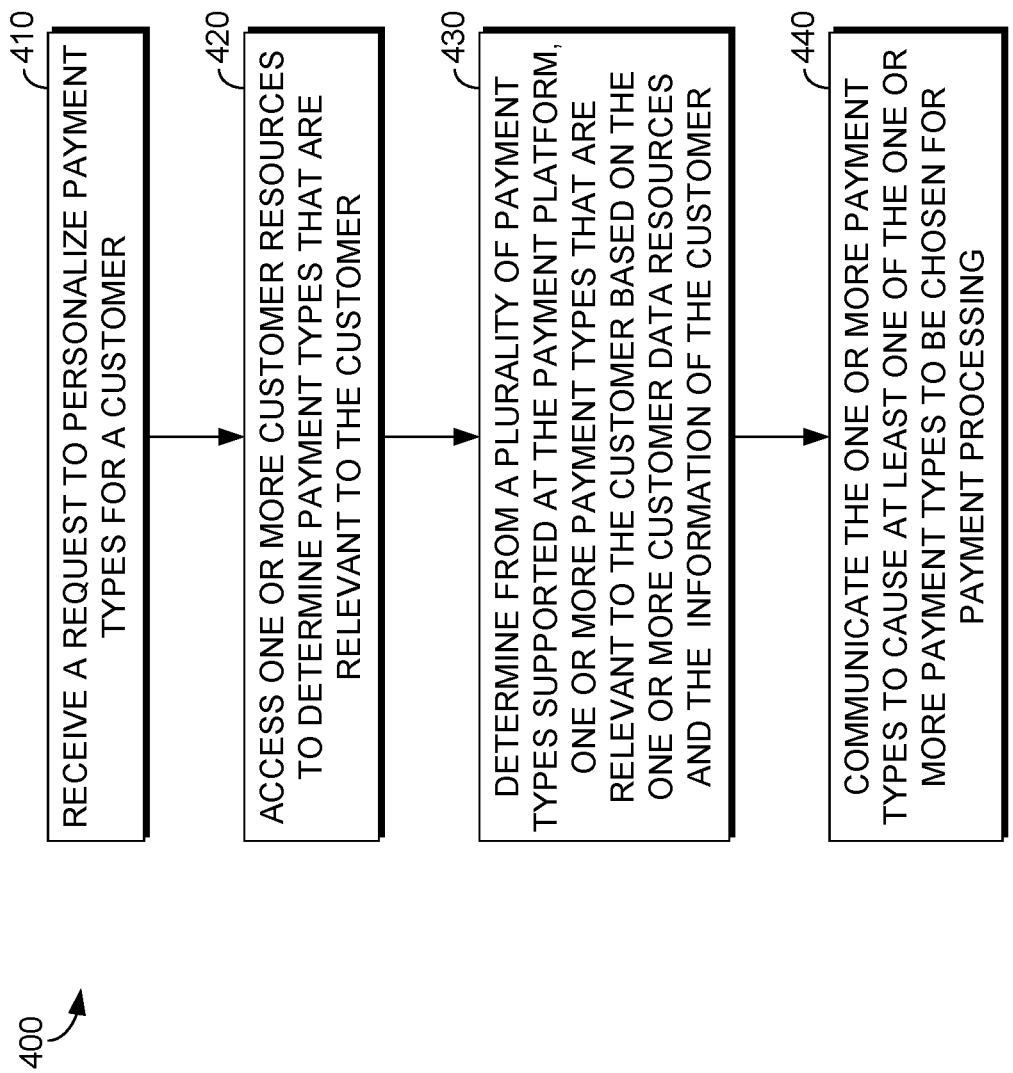
FIG. 4 is a flow diagram showing an exemplary method for implementing payment interface services using a payment platform, in accordance with embodiments described herein.

Turning now to FIG. 4, a flow diagram is provided that illustrates a method 400 for implementing payment interface services using a payment platform. At step 410, a request to personalize payment types for a customer is received. Personalizing payment types includes identifying payment types that are relevant to the customer based on information of the customer. At step 420, one or more customer data resources are accessed to determine payment types that are relevant to the customer. At step 430, one or more payment types that are relevant to the customer based on the one or more customer data resources and the information of the customer are determined from a plurality of payment types integrated at the payment platform. At step 440, communication of the one or more payment types is performed to cause at least one of the one or more payment types to be chosen for payment processing.

Figure 5:
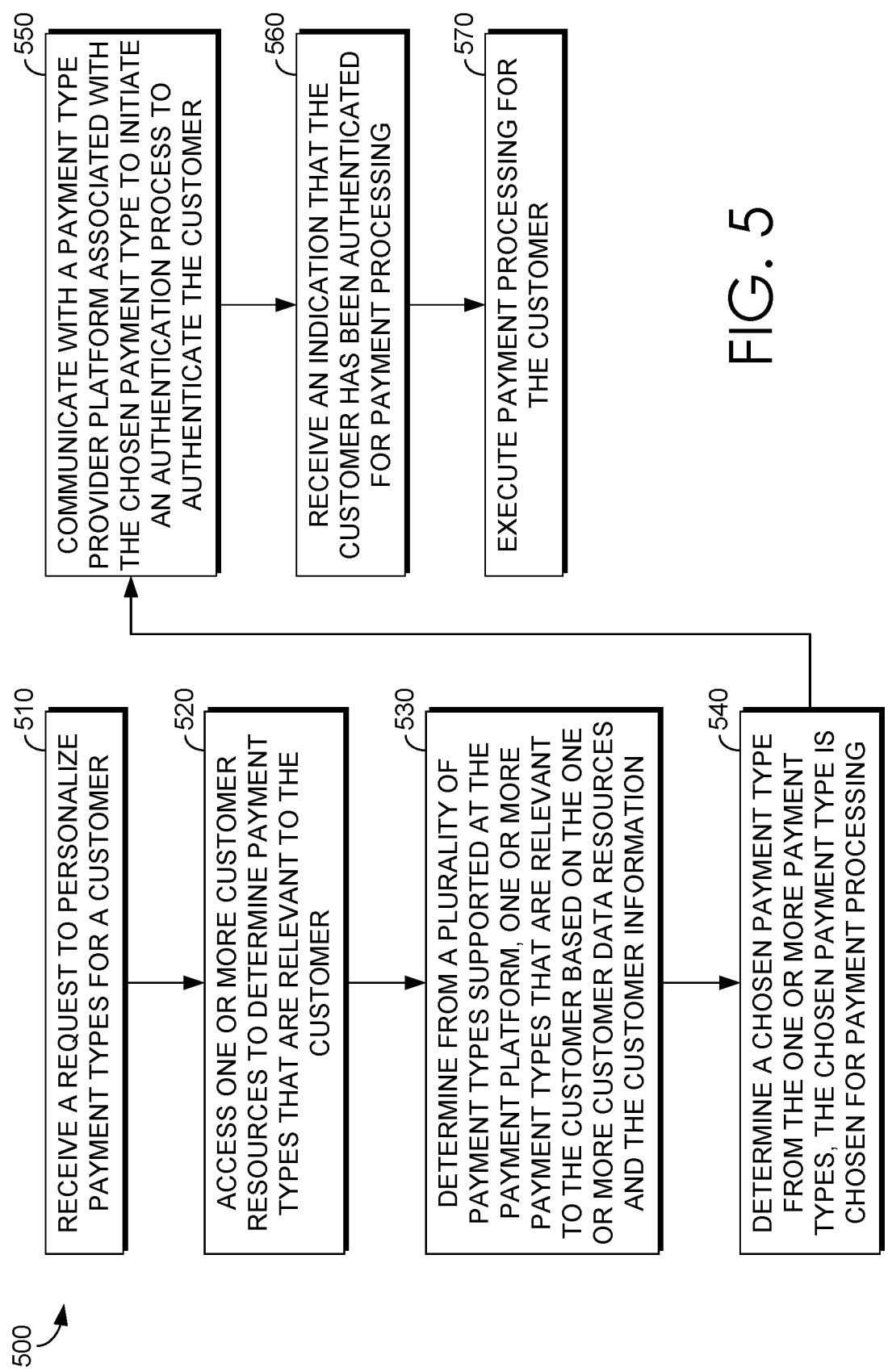
FIG. 5 is a flow diagram showing an exemplary method for implementing payment interface services using a payment platform, in accordance with embodiments described herein.

Turning now to FIG. 5, a flow diagram is provided that illustrates a method 500 for implementing payment interface services using a payment platform. Initially at block 510, a request to personalize payment types for a customer is received. Personalizing payment types includes identifying payment types that are relevant to the customer based on information of the customer. At block 520, one or more customer data resources are accessed to determine payment types that are relevant to the customer. At block 530, one or more payment types that are relevant to the customer based on the one or more customer data resources and the information of the customer are determined from a plurality of payment types integrated at the payment platform. At block 540, a chosen payment type from the one or more payment types is determined, the selected payment type is chosen for payment processing. At block 550, communication with a payment type provider platform associated with the chosen payment type is performed to initiate an authentication process to authenticate the customer for payment processing. At block 560, an indication that the customer has been authenticated payment processing is received; and at block 570, payment processing for the customer is executed.

Figure 6:
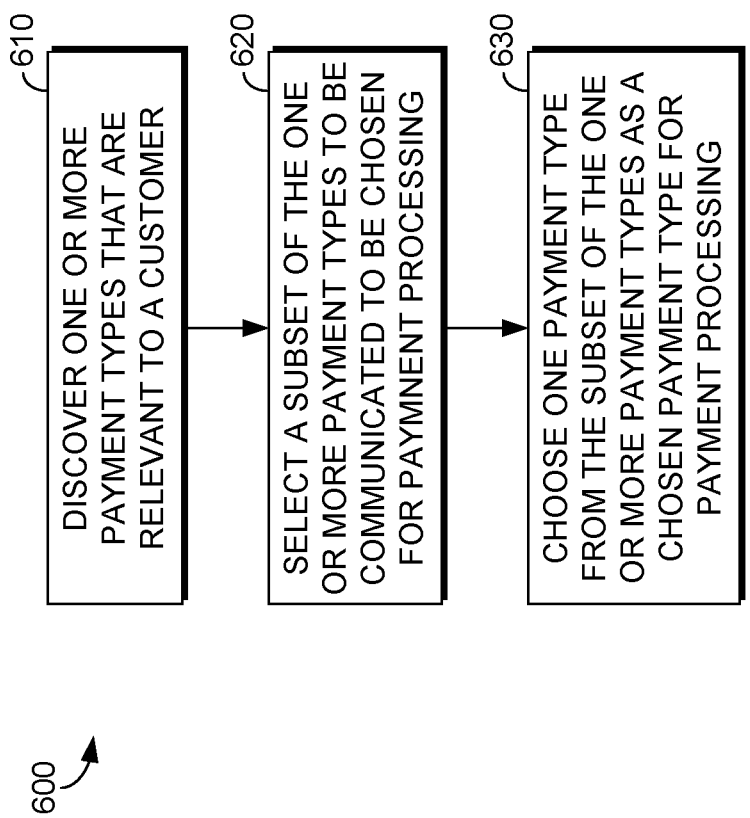
FIG. 6 is a flow diagram showing an exemplary method for implementing customer payment type personalization based on a personalization process using a payment platform, in accordance with embodiments described herein.

Turning now to FIG. 6, a flow diagram that illustrates a method 600 for implementing customer payment type personalization using a personalization process of a payment platform. Initially at block 610, one or more payment types that are relevant to a customer are discovered. The one or more payment types are discovered based on generating a discovery-query comprising the information of the customer used for identifying payment types; comparing the information of the customer in the discovery-query to information of the customer in the one or more customer data resources to identify at least a threshold match; and selecting payment types, associated with the information of the customer in the one or more data resources, that meet at the threshold match as the one or more payment types that are relevant to the customer. At block 620, a subset of the one or more payment types that are relevant to the customer is selected to be communicated to be chosen for payment processing. At block 630, one payment type from the subset of the one or more payment types that are relevant to the customer is chosen as a chosen payment type. The chosen payment type is automatically chosen for payment processing, without an explicit choice action performed by the customer or the chosen payment type from is based on an explicit choice action performed by the customer.

With reference to the payment platform, embodiments described herein can improve payment services based on the payment platform. The payment platform components refer to integrated components that implement payment interface services. The integrated components refer to the hardware architecture and software framework that support functionality using the payment platform. The hardware architecture refers to physical components and interrelationships thereof and the software framework refers to software providing functionality that can be implemented with hardware operated on a device. The end-to-end software-based payment platform can operate within the platform components to operate computer hardware to provide platform functionality. As such, the payment platform components can manage resources and provide services for the payment interface functionality. Any other variations and combinations thereof are contemplated with embodiments of the present invention.

By way of example, the payment platform can include an API library that includes specifications for routines, data structures, object classes, and variables may support the interaction the hardware architecture of the device and the software framework of the payment platform. These APIs include configuration specifications for the payment platform such that the components therein can communicate with each other in the payment platform, as described herein.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," "mobile device," "wearable device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" involves "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to distributed computing devices, components, and a payment platform that supports implementing payment interface services. Components can be configured for performing novel aspects of embodiments, where configured for includes programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer implemented method performed by a payment platform having at least a processor and a memory therein, the method comprising:

initializing, by the payment platform, first communication channels between the payment platform and a plurality of payment type provider platforms using a first set of application programming interfaces (APIs), wherein the plurality of payment type provider platforms provide a plurality of payment types, and wherein the first set of APIs define standardized protocol-based messaging and a structure for request and response messages to integrate payment services provided by the plurality of payment type provider platforms into the payment platform;

initializing, by the payment platform, a second communication channel with a merchant platform;

receiving, at a payment interface of the payment platform, a request from a merchant platform via the second communication channel, wherein the request comprises a request message generated by the merchant platform using a second set of APIs and includes customer information used by the payment platform to personalize payment types for a customer of the merchant platform, and wherein the merchant platform and the payment platform communicate via the payment interface using request and response messages defined by the second set of APIs over the second communication channel to provide the merchant platform access to a plurality of payment types integrated at the payment platform, wherein the second set of APIs define standardized protocol-based messaging for request and response messages between the payment platform and the merchant platform for generating checkout pages on an interface provided by the merchant platform to the customer;

retrieving, by the payment platform, one or more customer data resources from a customer information database to determine payment types that are relevant to the customer, wherein the customer data resources are retrieved at least in part from the plurality of payment type provider platforms over one or more of the first communication channels using request messages generated using the first set of APIs and transmitted by the payment platform to the plurality of payment type provider platforms;

determining, by the payment platform, from a plurality of payment types integrated at the payment platform, one or more payment types that are relevant to the customer based on comparing the one or more customer data resources to the customer information, comprising:
  calculating by a machine-learning-based model, for the payment types determined to be relevant to the customer, a corresponding plurality of probabilities based at least in part on a set of attributes of customer information that the customer will elect a particular payment type for payment processing,
  ranking the payment types based on their corresponding probabilities, and
  selecting the one or more payment types as payment types having a probability above a threshold value;
communicating, by the payment platform over the second communication channel using one or more messages generated by the payment platform using the second set of APIs, the determined one or more payment types to the merchant platform, to cause at least one of the one or more payment types to be chosen for payment processing, wherein the one or more messages cause the merchant platform to display the one or more payment types in an order based on the ranking as personalized payment types for the customer within a user interface of the merchant platform; and
completing, by the payment platform, payment processing using the one of the one or more payment types chosen by the customer for completion of the transaction between the customer and the merchant system.

2. The method of claim 1, wherein the request is received based on the customer selecting an indication to initiate or complete a transaction at the merchant platform, and wherein checking out comprises requesting processing of payment for a transaction supported at the merchant platform.

3. The method of claim 1, wherein the first set of APIs and the second set of APIs facilitate communications via interfaces for providing payment interface services.

4. The method of claim 1, wherein one or more customer data resources include customer payment type preference data, payment type provider customer data, and customer payment type historical data stored at least at the payment type provider platforms, wherein the customer payment type preference data, payment type provider customer data and customer payment type historical data are used to determine payment types that are relevant to the customer.

5. The method of claim 1, wherein determining the one or more payment types that are relevant to the customer is based a personalization process that comprises:
  discovering the one or more payment types that are relevant to the customer; and
  selecting, based on predefined factors, a subset of the one or more payment types, that are relevant to the customer, to be communicated to be chosen by the customer for processing the transaction.

6. The method of claim 5, wherein discovering the one or more payment types that are relevant to the customer is based on:
  generating a discovery-query comprising the customer information used for identifying payment types;
  comparing customer information in the discovery-query to customer information in the one or more customer data resources to identify at least a threshold match, wherein a threshold for determining the threshold match is based at least in part on historical transaction data associated with the merchant platform; and
  selecting payment types, associated with the customer information in the one or more data resources, that meet the threshold match, as the one or more payment types that are relevant to the customer.

7. The method of claim 1, wherein the one or more payment types are communicated by the payment platform to the merchant platform over the second communication channel using the second set of APIs with payment type provider customer data corresponding to the one or more payment types.

8. The method of claim 1, wherein applying the machine-learning-based model comprises applying one or more of a plurality of machine-learning-based models comprising: (i) a customer machine-learning-based model constructed for the customer from past transactions of the customer with the merchant platform, other merchant platforms, or a combination thereof, (ii) an other customer machine-learning-based model constructed from past transactions of one or more other customers with the merchant platform, other merchant platforms, or a combination thereof, and wherein each of the one or more other customers has similar characteristics to the customer, and (iii) a merchant machine-learning-based model constructed from past transactions of the merchant platform, other merchant platforms, or a combination thereof, to calculate the corresponding set of probabilities.

9. The method of claim 8, wherein the plurality of machine-learning-based models are constructed by the commerce platform prior to the transaction for determining the probabilities for the customer at different levels of specificity, and wherein one or more specific machine-learning-based models are selected by the commerce platform from the plurality of machine-learning-based models for calculation of the corresponding set of probabilities for the customer based on: whether the customer can be uniquely identified from the customer information for selection of the customer machine-learning-based model, whether the customer shares one or more attributes with other customers for selection of the other customer machine-learning-based model constructed from past transactions of other customers, whether the customer has previously transacted with the merchant platform or other merchant platforms for selection of the merchant machine-learning-based model, or a combination thereof.

10. The method of claim 1, wherein applying the machine-learning-based model comprises:
  constructing an ensemble of machine-learning-based models that each predict probabilities that the customer will elect particular payment types based at least in part on a set of attributes of customer information, the ensemble comprising one or more regression based models, one or more a random forest based models, and one or more support vector machine based models;
  applying each of the ensemble of machine-learning-based models to calculate, for the payment types determined to be relevant to the customer, corresponding probabilities that the customer will elect the particular payment type for payment processing to complete the transaction with the merchant platform;
  combining results generated by each of the ensemble of machine-learning-based models to generate combined probabilities that the customer will elect the particular payment type for payment processing to complete the transaction with the merchant platform; and
  using the combined probabilities when ranking and selecting the payment types.

11. Non-transitory computer readable storage media having instructions stored thereupon that, when executed by a payment platform having at least a processor and a memory therein, the instructions cause the payment platform to perform operations comprising:
- initializing, by the payment platform, first communication channels between the payment platform and a plurality of payment type provider platforms using a first set of application programming interfaces (APIs), wherein the plurality of payment type provider platforms provide a plurality of payment types, and wherein the first set of APIs define standardized protocol-based messaging and a structure for request and response messages to integrate payment services provided by the plurality of payment type provider platforms into the payment platform;
- initializing, by the payment platform, a second communication channel with a merchant platform;
- receiving, at a payment interface of the payment platform, a request from a merchant platform via the second communication channel, wherein the request comprises a request message generated by the merchant platform using a second set of APIs and includes customer information used by the payment platform to personalize payment types for a customer of the merchant platform, and wherein the merchant platform and the payment platform communicate via the payment interface using request and response messages defined by the second set of APIs over the second communication channel to provide the merchant platform access to a plurality of payment types integrated at the payment platform, wherein the second set of APIs define standardized protocol-based messaging for request and response messages between the payment platform and the merchant platform for generating checkout pages on an interface provided by the merchant platform to the customer;
- retrieving, by the payment platform, one or more customer data resources from a customer information database to determine payment types that are relevant to the customer, wherein the customer data resources are retrieved at least in part from the plurality of payment type provider platforms over one or more of the first communication channels using request messages generated using the first set of APIs and transmitted by the payment platform to the plurality of payment type provider platforms;
- determining, by the payment platform, from a plurality of payment types integrated at the payment platform, one or more payment types that are relevant to the customer based on comparing the one or more customer data resources to the customer information, comprising:
  - calculating by a machine-learning-based model, for the payment types determined to be relevant to the customer, a corresponding plurality of probabilities based at least in part on a set of attributes of customer information that the customer will elect a particular payment type for payment processing,
  - ranking the payment types based on their corresponding probabilities, and
  - selecting the one or more payment types as payment types having a probability above a threshold value;
- communicating, by the payment platform over the second communication channel using one or more messages generated by the payment platform using the second set of APIs, the determined one or more payment types to the merchant platform, to cause at least one of the one or more payment types to be chosen for payment processing, wherein the one or more messages cause the merchant platform to display the one or more payment types in an order based on the ranking as personalized payment types for the customer within a user interface of the merchant platform; and
- completing, by the payment platform, payment processing using the one of the one or more payment types chosen by the customer for completion of the transaction between the customer and the merchant system.

12. The non-transitory computer readable storage media of claim 11, wherein the chosen payment type from the one or more payment types that are relevant to the customer is automatically chosen for payment processing without an explicit choice action performed by the customer, wherein the one of the one or more payment types is selected based on customer payment type preference data.

13. The non-transitory computer readable storage media of claim 11, wherein the chosen payment type is a selected payment type of the customer, and
- wherein based on the customer selecting the chosen payment type, one or more fraud protection operations are triggered in that the chosen payment type is associated with a selection power index that indicates a low likelihood of the customer selecting the chosen payment type.

14. The non-transitory computer readable storage media of claim 11, further comprising:
- communicating with a payment type provider platform associated with a chosen payment type to initiate an authentication process to authenticate the customer to the payment type provider platform for payment processing;
- wherein the authentication process comprises direct communication between the payment type provider platform associated with the chosen type and a platform of the customer to authenticate the customer based on an authentication mechanism;
- wherein the authentication process comprises a standard set of authentication flows that are reused across merchant platforms and payment types; and
- further wherein the authentication process comprises one of: a primary authentication option or a secondary authentication option.

15. The non-transitory computer readable storage media of claim 11,
- wherein the machine-learning-based model supports testing, training, and predication phases using a Random Forrest ensemble learning technique to, at least in part, identify an optimal set of attributes of the customer data used in determining the one or more payment types by growing cross-validated classification trees for subsets of customer attributes, wherein each tree in the cross-validated classification trees is used to predict relevance for each payment type.

16. The non-transitory computer readable storage media of claim 11, wherein executing payment processing further comprises the payment type provider platform debiting an account of the customer and settling the funds to payment interface provider platform to cause the payment interface provider platform to settle funds with the merchant platform.

17. A system comprising:
- a processor;
- a memory;
- a payment interface of a payment platform configured to receive a request from a merchant platform at the payment interface of the payment platform, wherein the payment interface is configured to:

initialize first communication channels between the payment platform and a plurality of payment type provider platforms using a first set of application programming interfaces (APIs), wherein the plurality of payment type provider platforms provide a plurality of payment types, and wherein the first set of APIs define standardized protocol-based messaging and a structure for request and response messages to integrate payment services provided by the plurality of payment type provider platforms into the payment platform, initialize a second communication channel with a merchant platform, receive a request from a merchant platform via the second communication channel, wherein the request comprises a request message generated by the merchant platform using a second set of APIs and includes customer information used by the payment platform to personalize payment types for a customer of the merchant platform, and wherein the merchant platform and the payment platform communicate via the payment interface using request and response messages defined by the second set of APIs over the second communication channel to provide the merchant platform access to a plurality of payment types integrated at the payment platform, wherein the second set of APIs define standardized protocol-based messaging for request and response messages between the payment platform and the merchant platform for generating checkout pages on an interface provided by the merchant platform to the customer, retrieve one or more customer data resources from a customer information database to determine payment types that are relevant to the customer, wherein the customer data resources are retrieved at least in part from the plurality of payment type provider platforms over one or more of the first communication channels using request messages generated using the first set of APIs and transmitted by the payment platform to the plurality of payment type provider platforms, determine from a plurality of payment types integrated at the payment platform, one or more payment types that are relevant to the customer based on comparing the one or more customer data resources to the customer information, comprising the payment interface to:
  calculate by a machine-learning-based model, for the payment types determined to be relevant to the customer, a corresponding plurality of probabilities based at least in part on a set of attributes of customer information that the customer will elect a particular payment type for payment processing,
  rank the payment types based on their corresponding probabilities, and
  select the one or more payment types as payment types having a probability above a threshold value;

communicate, over the second communication channel using one or more messages generated by the payment platform using the second set of APIs, the determined one or more payment types to the merchant platform, to cause at least one of the one or more payment types to be chosen for payment processing, wherein the one or more messages cause the merchant platform to display the one or more payment types in an order based on the ranking as personalized payment types for the customer within a user interface of the merchant platform; and complete, by the payment platform, payment processing using the one of the one or more payment types chosen by the customer for completion of the transaction between the customer and the merchant system.

18. The system of claim 17, wherein the payment interface further comprises multi-payment type component configured to:

initialize communication channels with a plurality of payment type provider platforms for communicating messages for implementing payment interface services;

track a plurality of merchant platforms that are subscribed to the payment platform to cause implementation of payment interface services for transactions at the plurality of merchant platforms using the communication channels of the plurality of payment type provider platforms; and provide an interface for the plurality of payment type provider platforms and the plurality of merchant platforms to retrieve and implement the first set of APIs and the second set of APIs; and further wherein the payment platform further comprises a merchant component, the merchant component configured to communicate, to the payment interface, the request to personalize payment types for the customer, wherein the request includes the information of the customer used to identify the one or more payment types;

the merchant component further configured to receive the one or more payment types from the payment interface component; and the merchant component further configured to generate a checkout page having the one or more payment types.

19. The system of claim 17, further comprising a payment type provider component configured to:

maintain a communication channel with the payment interface component;

receive a discovery-query from the payment interface component to determine whether a relationship exists between the customer and a payment type provider of the payment type provider component based on the customer information; and communicate a response to the discovery-query, wherein the response is determined based on accessing customer data resources at the payment type provider component.

20. The system of claim 17, wherein the payment interface component further comprises a customer payment type personalization component configured to determine the one or more payment types that are relevant to the customer based on initiating a personalization process that comprises discovering and selecting the one or more payment types.

21. The system of claim 20, wherein the personalization process further comprises choosing one payment type from the one or more payment types that are relevant to the customer as a chosen payment type, wherein the chosen payment type is automatically chosen for payment processing, without an explicit choice action performed by the customer or the chosen payment type from is based on an explicit choice action performed by the customer.

22. The system of claim 21, further comprising a payment interface component configured to:

communicate with payment type provider components associated with the chosen payment type to initiate an authentication process to authenticate the customer for payment processing;

receiving an indication that the customer has been authenticated for payment processing; and executing payment processing for the customer.

23. The system of claim 22, further comprising a payment type provider component configured to directly communicate with a customer component to authenticate the customer based on an authentication mechanism, the payment type provider component is associated with the chosen payment type, wherein the authentication process comprises at least one of a primary authentication option or a secondary authentication option.

* * * * *